US009771938B2

(12) United States Patent
Blankemeier et al.

(10) Patent No.: US 9,771,938 B2
(45) Date of Patent: Sep. 26, 2017

(54) ROTARY DEVICE HAVING A RADIAL MAGNETIC COUPLING

(71) Applicant: PeopleFlo Manufacturing, Inc., Franklin Park, IL (US)

(72) Inventors: William R. Blankemeier, Oak Park, IL (US); Clark J. Shafer, Bolingbrook, IL (US); Radosav Trninich, Elmhurst, IL (US); Jorge G. Murphy, Bolingbrook, IL (US); James A. Nard, Crestwood, IL (US); Jason M. Sexton, Aurora, IL (US)

(73) Assignee: PeopleFlo Manufacturing, Inc., Franklin Park, IL (US)

( * ) Notice: Subject to any disclaimer, the term of this patent is extended or adjusted under 35 U.S.C. 154(b) by 352 days.

(21) Appl. No.: 14/204,509

(22) Filed: Mar. 11, 2014

(65) Prior Publication Data
US 2015/0260191 A1 Sep. 17, 2015

(51) Int. Cl.
*F04D 13/02* (2006.01)
*H02K 49/10* (2006.01)
*F04D 1/04* (2006.01)

(52) U.S. Cl.
CPC ............ *F04D 13/025* (2013.01); *F04D 1/04* (2013.01); *F04D 13/026* (2013.01); *H02K 49/106* (2013.01)

(58) Field of Classification Search
CPC .... F04D 13/024; F04D 13/025; F04D 13/026; F04D 29/048; F04D 1/04; H02K 49/106
(Continued)

(56) References Cited

U.S. PATENT DOCUMENTS 2,386,505 A * 10/1945 Puchy ................. F25B 15/10
188/264 P
3,395,644 A * 8/1968 Grebel ............... F04D 13/0613
310/58
(Continued)

FOREIGN PATENT DOCUMENTS

DE          4009199 A1    9/1991
DE    202004013080 U1    1/2006
(Continued)

OTHER PUBLICATIONS

Author: SPXFLOW Title: Waukesha E-series pump Publication date (mm/yyyy): May 2016 Accessed Date (mm/dd/yyyy): Feb. 22, 2017 Link: http://www.spxflow.com/en/assets/pdf/SPX-0010_E-Series_MagDrive_Pum%20Brochure.pdf.*
(Continued)

*Primary Examiner* — Theodore Stigell
*Assistant Examiner* — Chirag Jariwala
(74) *Attorney, Agent, or Firm* — Cook Alex Ltd.

(57) ABSTRACT

Rotary devices having a casing and an inner drive portion of a magnet coupling disposed inside of a rotor assembly are disclosed. The inner drive portion and rotor assembly are disposed within the casing and rotatable about a rotational axis. The rotor assembly includes a bushing between the magnets of the rotor assembly and a stationary canister is sealed to the casing and separates an internal fluid chamber within the casing from the inner driven portion. The stationary canister can be of multi-piece or unitary construction and is held in position by a front portion of the casing.

18 Claims, 17 Drawing Sheets

(58) Field of Classification Search
USPC .................................... 417/420, 423.7, 352
See application file for complete search history.

(56) References Cited

U.S. PATENT DOCUMENTS

| | | | |
|---|---|---|---|
| 3,520,642 A | 7/1970 | Fulton | |
| 4,047,847 A | 9/1977 | Oikawa | |
| 4,065,234 A | 12/1977 | Yoshiyuki et al. | |
| 4,207,485 A | 6/1980 | Silver | |
| 4,226,574 A | 10/1980 | Villette | |
| 4,304,532 A | 12/1981 | McCoy | |
| 4,645,432 A * | 2/1987 | Tata | F01P 5/12 |
| | | | 415/10 |
| 4,648,808 A * | 3/1987 | Hauenstein | F04D 13/027 |
| | | | 415/106 |
| 4,752,194 A | 6/1988 | Wienen et al. | |
| 4,780,066 A | 10/1988 | Bolleter et al. | |
| 4,793,777 A * | 12/1988 | Hauenstein | F04D 29/041 |
| | | | 415/106 |
| 4,850,818 A | 7/1989 | Kotera | |
| 4,998,863 A | 3/1991 | Klaus | |
| 5,045,026 A | 9/1991 | Buse | |
| 5,201,642 A | 4/1993 | Hinckley | |
| 5,248,245 A | 9/1993 | Behnke et al. | |
| 5,253,986 A | 10/1993 | Bond et al. | |
| 5,269,664 A * | 12/1993 | Buse | F04D 29/061 |
| | | | 417/360 |
| 5,288,213 A * | 2/1994 | Nasr | F04D 13/026 |
| | | | 417/368 |
| 5,332,374 A | 7/1994 | Kricker et al. | |
| 5,368,439 A | 11/1994 | Piazza | |
| 5,407,331 A | 4/1995 | Atsumi | |
| 5,464,333 A | 11/1995 | Okada et al. | |
| 5,501,582 A * | 3/1996 | Gautier | F04D 13/027 |
| | | | 415/110 |
| 5,580,216 A | 12/1996 | Munsch | |
| 5,915,931 A | 6/1999 | Lindner et al. | |
| 6,095,770 A | 8/2000 | Obata et al. | |
| 6,264,440 B1 | 7/2001 | Klein et al. | |
| 6,293,772 B1 | 9/2001 | Brown et al. | |
| 6,302,661 B1 | 10/2001 | Khanwilkar et al. | |
| 6,417,591 B1 | 7/2002 | Saito et al. | |
| 6,443,710 B1 | 9/2002 | Tatsukami et al. | |
| 6,457,951 B2 | 10/2002 | Rennett et al. | |
| 6,524,083 B2 | 2/2003 | Deai et al. | |
| 6,551,075 B2 | 4/2003 | Gabrieli et al. | |
| 6,554,576 B2 | 4/2003 | Rennett et al. | |
| 6,607,370 B2 | 8/2003 | Fukamachi et al. | |
| 6,626,644 B2 | 9/2003 | Ozaki | |
| 6,672,818 B1 | 1/2004 | Terracol et al. | |
| 6,808,371 B2 | 10/2004 | Niwatsukino et al. | |
| 6,908,291 B2 | 6/2005 | Klein et al. | |
| 7,033,146 B2 | 4/2006 | Shi | |
| 7,048,518 B2 | 5/2006 | Oliveira | |
| 7,057,320 B2 | 6/2006 | Abordi et al. | |
| 7,101,158 B2 | 9/2006 | Hembree et al. | |
| 7,137,793 B2 | 11/2006 | Shafer et al. | |
| 7,249,939 B2 * | 7/2007 | Yanagihara | F04D 29/026 |
| | | | 417/420 |
| 7,467,930 B2 | 12/2008 | Ozaki et al. | |
| 7,500,829 B2 | 3/2009 | Edwards et al. | |
| 7,549,205 B2 | 6/2009 | Shafer | |
| 7,572,115 B2 | 8/2009 | Klein et al. | |
| 7,707,720 B2 | 5/2010 | Klein et al. | |
| 7,871,254 B2 | 1/2011 | Ito | |
| 8,079,828 B2 | 12/2011 | Togawa et al. | |
| 8,114,008 B2 | 2/2012 | Hidaka et al. | |
| 8,333,666 B2 | 12/2012 | Ekberg et al. | |
| 8,905,728 B2 * | 12/2014 | Blankemeier | F04D 13/022 |
| | | | 277/630 |
| 8,905,729 B2 * | 12/2014 | Blankemeier | F04D 13/0626 |
| | | | 277/630 |
| 2003/0072656 A1 | 4/2003 | Niwatsukino et al. | |
| 2004/0184936 A1 | 9/2004 | Yanagihara et al. | |
| 2006/0288560 A1 | 12/2006 | Shafer | |
| 2010/0028176 A1 | 2/2010 | Platt | |
| 2012/0177511 A1 | 7/2012 | Sexton et al. | |
| 2013/0171011 A1 | 7/2013 | Blankemeier et al. | |
| 2013/0171012 A1 | 7/2013 | Blankemeier et al. | |
| 2015/0337844 A1* | 11/2015 | Eschner | F04D 13/025 |
| | | | 417/423.14 |

FOREIGN PATENT DOCUMENTS

| | | |
|---|---|---|
| EP | 0823027 B1 | 2/1998 |
| EP | 2607704 | 6/2013 |
| JP | 2005330908 A | 12/2005 |
| JP | 2011021596 A | 2/2011 |
| RO | 123090 B1 | 9/2010 |

OTHER PUBLICATIONS

International Preliminary Report on Patentability for PCT/US2015/012598 dated Apr. 7, 2016.
ISR and WO for PCT/US2015/012598 dated May 4, 2015.

* cited by examiner

ROTARY DEVICE HAVING A RADIAL MAGNETIC COUPLING

BACKGROUND OF THE INVENTION

Field of the Invention

The present invention generally relates to radial magnetic couplings that may be used in rotary equipment, such as pumps, mixers and compressors, and more particularly to rotary devices having a radial magnetic coupling wherein the magnetic coupling transmits torque from one component to another through a stationary fluid barrier.

Discussion of the Prior Art

In many rotary devices, such as pumps, mixers and compressors, it is desirable to avoid rotating seals. Magnetic couplings have been developed with a magnet coupling that utilizes a driven component and a drive component with the driven component being driven via a non-contacting permanent magnet coupling in a radial magnet orientation. Such equipment frequently is referred to as being sealless, but actually includes inner and outer magnets separated by a canister that is sealed with one or more static seals.

Radial magnetic couplings that utilize permanent magnets are common, for example, in rotodynamic (also known as kinetic or centrifugal) pumps. The radial magnetic couplings consist of three main components: a larger, outer coupling component (also known as an outer magnet ring or outer rotor) with multiple permanent magnets on its inner surface; a smaller, inner coupling component (also known as an inner magnet ring or inner rotor) with multiple permanent magnets on its outer surface; and a containment canister (also known as a can, shell, shroud, barrier or portion of a casing) separating the inner and outer components and forming a stationary boundary or barrier for the fluid chamber. The magnets on the inner and outer components are disposed in axial alignment with each other to match up and synchronize the inner and outer components, such that as one component is rotated, the other component is synchronized and forced to follow, whereby the pump impeller or pumping rotor is driven. Neither of the inner or outer coupling components physically touches the other, and they rotate in separate environments, separated by the canister.

The radial magnetic couplings are of two configurations, "outer drive" and "inner drive". Most radial magnetic couplings have an outer drive arrangement in which the outer magnetic coupling component is outside of the canister, and therefore, outside of the equipment's fluid chamber, which would be contained within the canister. The outer magnetic coupling component in such equipment usually is driven by an external power source, such as a motor. In such configurations, the inner magnetic coupling component is disposed inside the equipment's fluid chamber and is connected to the equipment's rotor. Thus, in such outer drive arrangements, a containment canister provides the boundary for the equipment's fluid chamber, with the fluid chamber being inside the canister.

Although less common, some radial magnetic couplings have an inner drive arrangement, which utilizes the same three general components, but the roles are reversed. The inner magnetic coupling component is inside of the canister, and the equipment's fluid chamber is defined by the space between the outside of the canister and the casing. The inner drive portion also usually is driven by an external power source, such as a motor, while the outer magnetic coupling component is outside of the canister and is within the equipment's fluid chamber, and is connected to the equipment's rotor. The canister again provides the boundary for the equipment's fluid chamber, but in an inner drive arrangement the fluid chamber is outside of the canister.

Permanent magnet coupled pumps generally utilize end suction via an axial inlet, are of single stage or multistage configuration, and may include an overhung impeller design. The overhung impeller design has the impeller mounted on a rotor assembly which contains a first magnet ring of a magnet coupled drive spaced from the pumping element. A second magnet ring is mounted on the rotatable shaft of a frame that is coupled to a motor or power drive device. The pump, frame that supports the rotatable shaft and the power drive device generally are mounted on a common base plate. Close coupled permanent magnet coupled pumps tend to be of a somewhat similar construction to the separately coupled version, except that the second magnet ring is mounted directly on the driver shaft of the power drive device. The drive section utilizes permanent magnets or an eddy current drive system to transmit power to the impeller. This type of sealless pump uses a standard motor to drive the second magnet ring, which in turn, via the magnetic coupling, drives the first magnet ring. A containment canister that contains the process fluid sealingly separates the magnet components.

Typically, the canister is a unitary (1-piece) design shaped like a cup, with a thin generally cylindrical portion between the magnets and a flat or domed portion closing off one end. The thin cylindrical portion is advantageous to minimize the total radial gap between the inner and outer magnets, so as to create more torque for a given volume of magnet material. In most cases, the canister is made of metal, since metal allows for a strong yet thin design. But because metal is electrically conductive, eddy currents are created in the canister when the coupling is rotated due to the rotating magnetic field between the inner and outer magnets. These eddy currents convert some of the transmitted power into heat, which wastes power and often has detrimental effects on the equipment and/or the fluid within the equipment.

Some canister designs use non-metallic composites instead of metal. This eliminates the eddy current heating, but usually results in a much thicker cylindrical portion between the magnets, which increases the total radial gap between the magnets and therefore reduces the torque created for a given volume of magnet material.

Most magnetic coupling designs also require the magnets to be protected from contact with the fluid inside the equipment. For a rotor that is inside the fluid chamber, this usually requires a separate component or components, such as a sleeve or coating between the magnets and the canister, which unfortunately increases the total radial gap between the magnets, and therefore, reduces torque.

All magnetic coupling designs have some form of a bearing system to support a rotor inside the fluid-chamber. This support is normally needed in both a radial and an axial direction. In most cases, the bearing system is a plain bearing system, where the support is accomplished by bearing surfaces sliding against each other. In most cases, these systems have separate stationary and rotating components, each with one or more bearing surfaces that engage each other to provide radial or axial support. When the sole or primary purpose of one of these components is to provide a bearing surface, then the component is commonly referred to as a bushing. The bushing components usually are not positioned within the radial gap between the magnets, since this would greatly increase the total radial gap between the magnets, and therefore, greatly reduce torque. Instead, they commonly are positioned on the rotor beyond one end or both ends of the magnets.

When a bushing is positioned at only one end, the rotor support is cantilevered, which disadvantageously allows much more deflection of the rotor. When bushings are positioned beyond both ends of the magnets, the undesired cantilever support is eliminated, but special care must be taken to ensure the bushings are precisely aligned with each other and the equipment may require greater axial space.

Also, it generally is advantageous to have a full fluid film between the bearing surfaces of the rotating bushing and the stationary component, especially when the bushing is of an elongated design, because it reduces friction and wear. For radial bushings, one way to improve the fluid film is to make the bearing surface of the bushing axially longer. However, because the bushings typically are positioned beyond either end of the magnets, lengthening the bearing surfaces would disadvantageously require substantially greater axial space.

The present disclosure addresses shortcomings in prior art equipment having a magnetic coupling, while providing numerous advantages over the prior art, as discussed herein.

SUMMARY OF THE INVENTION

The purpose and advantages of the disclosed subject matter will be set forth in and apparent from the description and drawings that follow, as well as will be learned by practice of the claimed subject matter. While the rotary magnetic drive systems of the present disclosure are shown incorporated into rotary devices in the configuration of a pump, it will be understood that the structures and principles of operation also may be utilized in other rotary equipment to transmit torque through a stationary fluid barrier, such as in mixers, compressors, or the like.

In a first aspect, the disclosure provides a rotary device having a magnet coupling comprising a casing having a front portion and a rear portion, a rotatable inner drive portion of a magnetic coupling having multiple magnets proximate an outer periphery of the inner drive portion, a rotor assembly that includes a driven portion of the magnetic coupling having multiple magnets proximate an inner periphery of the rotor assembly, and the inner drive portion and rotor assembly being disposed within the casing and being rotatable about a rotational axis. The rotary device further includes a stationary canister comprising a substantially cylindrical portion disposed between the magnets of the inner drive portion and the magnets of the rotor assembly and includes a radial bearing surface that engages the rotor assembly, an axial bearing surface that engages the rotor assembly in one axial direction, and separates an internal fluid chamber within the casing from the inner driven portion.

In a second aspect, the disclosure provides a rotary device having a magnet coupling comprising a casing having a front portion and a rear portion, a rotatable inner drive portion of a magnetic coupling having multiple magnets proximate an outer periphery of the inner drive portion, a rotor assembly that includes a driven portion of the magnetic coupling having multiple magnets proximate an inner periphery of the rotor assembly, and the inner drive portion and rotor assembly being disposed within the casing and being rotatable about a rotational axis. The rotary device further includes a stationary canister comprising a substantially cylindrical portion disposed between the magnets of the inner drive portion and the magnets of the rotor assembly, a canister end cap portion that seallingly closes a front end of the stationary canister and is supported by or integrally formed with the front portion of the casing, and a rear end of the stationary canister that contacts or is integral with the rear portion of the casing, wherein the stationary canister separates an internal fluid chamber within the casing from the inner driven portion, and wherein the rotor assembly further comprises a bushing disposed between the inner periphery of the magnets of the rotor assembly and the stationary canister wherein the bushing includes a radial bearing surface that engages the stationary canister, an axial bearing surface that engages the stationary canister in one axial direction, and separates the magnets of the rotor assembly from contact with fluid within the casing.

In a third aspect, the disclosure provides a rotary device having a magnet coupling comprising a casing having a front portion and a rear portion, a rotatable inner drive portion of a magnetic coupling having multiple magnets proximate an outer periphery of the inner drive portion, a rotor assembly that includes a driven portion of the magnetic coupling having multiple magnets proximate an inner periphery of the rotor assembly, the inner drive portion and rotor assembly being disposed within the casing and being rotatable about a rotational axis, and a stationary canister comprising a substantially cylindrical portion disposed between the magnets of the inner drive portion and the magnets of the rotor assembly, wherein the stationary canister is held in place radially and axially in compression through the substantially cylindrical portion between the front and rear casing portions and separates an internal fluid chamber within the casing from the inner driven portion.

In a fourth aspect, the disclosure provides a rotary device having a magnet coupling comprising a casing having a front portion and a rear portion, a rotatable inner drive portion of a magnetic coupling having multiple magnets proximate an outer periphery of the inner drive portion, a rotor assembly that includes a driven portion of the magnetic coupling having multiple magnets proximate an inner periphery of the rotor assembly, the inner drive portion and rotor assembly being disposed within the casing and being rotatable about a rotational axis, and a multi-piece canister having a substantially cylindrical portion constructed of a material that is non-conductive or semi-conductive and being disposed between the magnets of the inner drive portion and the magnets of the rotor assembly, and an end cap portion that closes the substantially cylindrical portion and is constructed of a material that is non-conductive, semi-conductive or conductive, and wherein the multi-piece stationary canister separates an internal fluid chamber within the casing from the inner driven portion.

In a fifth aspect, the disclosure provides a rotary device having a magnet coupling comprising a casing having a front portion and a rear portion, a rotatable inner drive portion of a magnetic coupling having multiple magnets proximate an outer periphery of the inner drive portion, a rotor assembly that includes a driven portion of the magnetic coupling having multiple magnets proximate an inner periphery of the rotor assembly, and the inner drive portion and rotor assembly being disposed within the casing and being rotatable about a rotational axis. The rotary device further includes a stationary canister comprising a substantially cylindrical portion disposed between the magnets of the inner drive portion and the magnets of the rotor assembly, a canister end cap portion that seallingly closes a front end of the stationary canister and is supported by or integrally formed with the front portion of the casing, and a rear end of the stationary canister that contacts or is integral with the rear portion of the casing. The rotary device also includes a bushing disposed between the inner periphery of the magnets of the rotor assembly and the substantially cylindrical portion of the stationary canister, and wherein the stationary canister separates an internal fluid chamber within the casing from the inner driven portion and the canister end cap portion is removable to access the inner drive portion while the rotor assembly remains within the rear portion of the casing.

The disclosure provides rotary devices that may include numerous advantageous aspects for rotary magnetically coupled devices, such as, a bushing that serves three purposes, a stationary canister that serves three purposes, the stationary canister being made of two separate parts including a substantially cylindrical portion and a canister end cap portion, and the two separate parts optionally being constructed of the same or different materials, with the stationary canister being held in compression through the substantially cylindrical portion between the front and rear casing portions when the device is fully assembled.

These advantages may be further enumerated or described in more discrete ways. For instance, the rotary device may have fewer parts because the bushing and substantially cylindrical portion of the stationary canister serve multiple purposes. There is no potential for misalignment of bearing surfaces, because the radial and thrust bearing surfaces are on a single bushing component and a complementary canister. The design also allows for a thin, non-conductive canister material, which eliminates the energy loss and heating from eddy currents, while minimizing the magnet radial gap for maximum torque. In addition, the simple shapes of the bushing and substantially cylindrical portion of the stationary canister allow for a very robust bushing made from silicon carbide, tungsten carbide or other suitable hard bushing materials. The bushing also provides for an excellent fluid-film, due to the long radial bearing surface of the bushing.

The rotary devices of the disclosure also may have improved casing fatigue life, because the casing is pre-stressed by placing the stationary canister in compression through the substantially cylindrical portion when the pump is assembled. This pre-stress negates some of the normal stress when the pump is pressurized, so the casing is exposed to less-extreme stress cycles during normal pressure on-off cycles.

In addition, the stationary canister is held in place axially and radially in compression through the substantially cylindrical portion, as opposed to being in tension. This is desirable as many suitable canister materials are stronger in compression than in tension, and this configuration eliminates cantilever support of the stationary canister. The compression or clamping force also allows use of a simple design for a static seal between the stationary canister and the canister end cap portion.

In a related manner, non-conductive materials that would be suitable for a typical canister (strong and thin) are expensive and difficult to form into complex shapes, such as a typical unitary (1-piece) cup-shaped canister having a cylindrical side wall and a closed end wall. However, the present disclosure includes a stationary canister having a substantially cylindrical portion and an end cap portion that are separate pieces, which provides advantages that include the substantially cylindrical portion being smaller (shorter in length) and having a much more simple shape (generally an open cylinder as opposed to a cup), so it can be made economically. This also permits use of a non-conductive canister material (positioned between the magnets), which eliminates the energy loss and heating from eddy currents, and the canister end cap portion does not need to be non-conductive, so it may be a rather simple, inexpensive part.

This design also has a unique feature in that the inner drive portion is easily accessed from the front of the pump when only two components are removed, namely, the casing front portion and the canister end cap portion. This, in turn, provides advantages that include easy assembly and disassembly of the rotary device, a simple and safe method of dealing with strong magnetic forces when joining or separating magnetically coupled components, the ability to join and separate magnetically coupled portions in a precise, controlled fashion which protects the substantially cylindrical portion of the stationary canister, which is particularly beneficial when the stationary canister is fragile, such as in a device where the canister may be made of silicon carbide, and the ability to inspect or remove the inner magnetic portion quickly without major pump disassembly.

The present disclosure further includes examples of alternative embodiments of rotary devices that highlight the fact that the inventive subject matter can be applied to equipment of various designs, even though the examples shown herein are in the form of pump configurations. Moreover, the rotary devices may be of metallic construction, or at least partially of non-metallic construction, such as for pumps where the fluids only contact non-metallic surfaces. Indeed, pumps in accordance with the present disclosure may include interior surfaces that are constructed of specific materials and/or have particular surface finishes wherein the interior surfaces permit use of the pumps in hygienic applications where microbial growth must be prevented.

Utilization of the subject matter in the present disclosure can lead to construction of rotary devices that are more compact, since the magnet coupling and bushings are essentially packaged within the same axial space. Thus, the axial length of rotary devices can be reduced, which may have advantages resulting in the ability to use longer magnets for greater torque generation within the same axial space. Alternatively, this may provide an option to use many smaller and/or less expensive components relative to a rotary device having a conventional magnet coupling. This, in turn, can result in rotary devices that require a smaller volume or space for mounting, and that are of lighter weight and are easier to handle.

It is to be understood that both the foregoing general description and the following detailed description are exemplary and provided for purposes of explanation only, and are not restrictive of the subject matter claimed. Further features and objects of the present disclosure will become more fully apparent in the following description of the preferred embodiments and from the appended claims.

BRIEF DESCRIPTION OF THE DRAWINGS

In describing the preferred embodiments, reference is made to the accompanying drawing figures wherein like parts have like reference numerals, and wherein.

Figure 1:
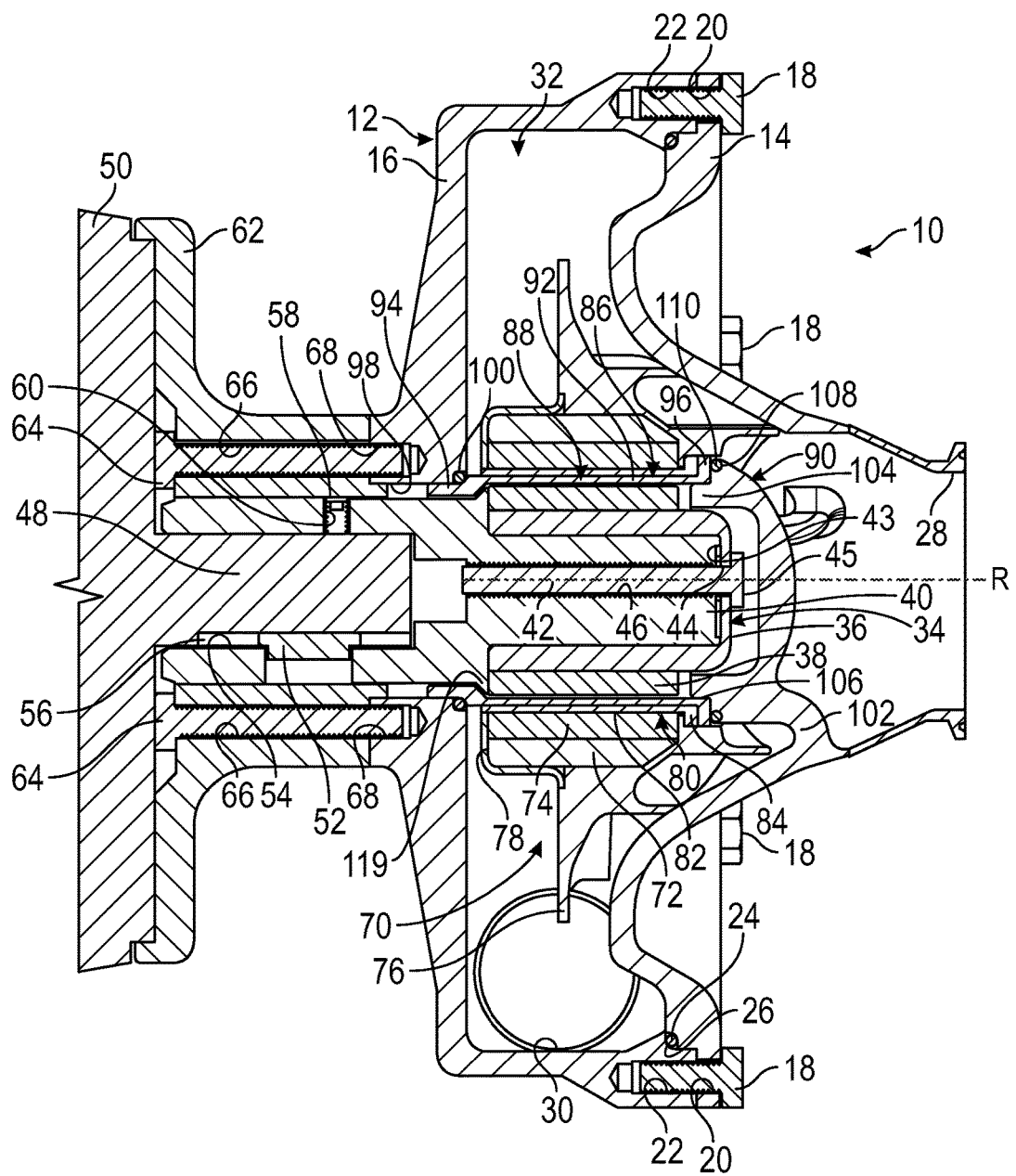
FIG. 1 is a cross-sectional view of a first example of a device having a rotatable inner drive portion and a magnet coupling which are disposed within a rotor assembly that includes an impeller of a pump.

It should be understood that the drawings are not to scale. While some mechanical details of a rotary device with magnet coupling, including details of fastening means and other plan and section views of the particular components, have not been included, such details are considered well within the comprehension of those of skill in the art in light of the present disclosure. It also should be understood that the present invention is not limited to the example embodiments illustrated.

DETAILED DESCRIPTION OF THE PREFERRED EMBODIMENTS

Referring generally to FIGS. 1-7C, it will be appreciated that a rotary device 10 in the configuration of a pump, and component parts thereof, are shown. The rotary device 10 includes a casing 12 having a casing front portion 14 connected to a casing rear portion 16. The connection may be made, for example, by using fasteners 18, shown as threaded bolts, which pass through bores 20 in the casing front portion 14 and into threaded bores 22 in the casing rear portion 16. The casing front portion 14 also is sealed to the casing rear portion 16 by use of a static seal 24, such as an elastomeric O-ring, or preformed or liquid gasket or the like, which is positioned in a seal retaining well 26 in the casing front portion 14.

The casing 12 may be constructed of rigid materials, such as steel, stainless steel, cast iron or other metallic materials, or structural plastics or the like. However, it will be appreciated that the casing 12 and all surfaces that contact the fluid that will flow through the pump may present a non-metallic surface, such as by use of a liner or application of a non-metallic coating. Thus, rotary equipment of the present disclosure may have interior surfaces that are constructed of specific materials and/or have particular interior surface finishes that permit use of the equipment in hygienic applications where microbial growth must be prevented. The casing 12 in this example also includes an inlet port 28 in the casing front portion 14 having an axial orientation and an outlet port 30 in the casing rear portion 16 having a radial orientation and being in communication with a pumping chamber 32 that is within the casing 12.

A rotatable inner drive portion 34 is disposed within the casing 12 and is rotatable about a rotational axis R. The inner drive portion 34 includes an inner magnet ring 36. The inner magnet ring 36 preferably is constructed of carbon steel or other suitable ferromagnetic material. Multiple magnets 38 are connected proximate an outer periphery of the inner drive portion 34. The magnets 38 are permanent magnets and may be of any configuration, but preferably are rectangular and connected to the inner magnet ring 36 by chemical means, such as by epoxy or adhesives, or may be connected by suitable fasteners, such as by rivets or the like.

The inner drive portion 34 is connected to a spindle or shaft extension 40 by receiving a fastener 42, shown as a threaded bolt, which passes through a bore 44 in the inner magnet ring 36. The fastener 42 receives a retainer ring 43 in a groove on its shaft just inside of the inner magnet ring 36. In this configuration, the end of the inner magnet ring 36 is captured between a head 45 of the fastener 42 and the retainer ring 43, but is free to rotate relative to the fastener 42. The threaded shaft of the fastener 42 is received in a threaded bore 46 in the spindle 40. The spindle 40, in turn, is connected to a shaft 48 of a motor 50 by use of an axially disposed key 52 in a keyway 54 of the spindle 40 and a corresponding keyway 56 of the shaft 48. In addition, a set screw 58 is radially disposed in a threaded bore 60 in the spindle 40 and engages the shaft 48 of the motor. The fastener 42 may be rotated to move the inner drive portion 34 toward or away from the spindle 40 and the magnetic coupling of the rotor assembly 70. The spindle 40 preferably is constructed of stainless steel, aluminum or other suitable non-ferromagnetic material, which prevents interaction with the magnets 74 during installation or removal of the spindle 40.

In this example, a bracket or adapter 62 is used to locate the motor 50 relative to the casing rear portion 16. This permits the casing rear portion 16 to be constructed of a different material than the bracket 62, such as may be desirable if trying to control costs while also having the casing rear portion 16 be constructed of stainless steel. The bracket 62 is connected to the casing rear portion 16 by fasteners 64, shown as threaded bolts, which pass through bores 66 in the bracket 62 and into threaded bores 68 in the casing rear portion 16.

A rotor assembly 70 is disposed within the pumping cavity 32 of the casing 12 and is rotatable about the rotational axis R. The rotor assembly 70 includes an outer magnet ring 72, with multiple magnets 74 connected proximate an inner periphery of the rotor assembly 70. The outer magnet ring 72 preferably is constructed of carbon steel or other suitable ferromagnetic material. As with the magnets 38 of the inner drive portion 34, the magnets 74 of the rotor assembly 70 are permanent magnets and may be of any configuration, but are preferably rectangular and arranged with alternating polarity for better magnetic flux between the ends of the magnets. The outer magnet ring 72 and magnets 74 are disposed within an impeller 76 which is joined at the rear by a cup-shaped retaining ring 78, and closed inwardly by a bushing 80 that includes a substantially cylindrical portion 82 that extends longitudinally from the cup-shaped retaining ring 78 at the rear of the rotor assembly 70 to a front rim 84 that extends radially outward to the inside of the impeller 76 at the front of the rotor assembly 70. These components of the rotor assembly 70 are held together by chemical means, such as by epoxy or adhesives, or may be connected by suitable fasteners, such as by rivets or the like.

A stationary canister 86 shields the inner drive portion 34 from fluid in the casing. The stationary canister 86 includes a generally cylindrical portion 88 and a separate canister end cap portion 90. In the inner drive arrangement of the present rotary device 10, the casing 12 and the outer surface of the stationary canister 86 define the pumping cavity 32 that is in communication with the inlet port 28 and outlet port 30. The generally cylindrical portion 88 has a relatively simple configuration without an integral closed end, so it can be constructed more easily and of materials such as silicon carbide, carbon graphite or any other suitable material other than ferromagnetic. The generally cylindrical portion 88 includes a substantially cylindrical portion 92 that extends between and separates the magnets 38 of inner drive portion 34 from the magnets 74 of the rotor assembly 70. The generally cylindrical portion 88 also includes a neck 94 at a rear end and a front rim 96 that extends radially outward at the front end.

In this example, the neck 94 has a smaller diameter than the substantially cylindrical portion 92. The neck 94 fits within a central bore 98 of the casing rear portion 16 and is sealed to the casing rear portion by a static seal 100. Similar to the seal 24 between the casing front and rear portions 14, 16, the seal 100 may be constructed of various materials, such as an elastomeric O-ring, or preformed or liquid gasket or the like, which is positioned on the outer wall of the generally cylindrical portion 88 at the step in diameter from the neck 94 to the substantially cylindrical portion 92.

In this example, the canister end cap portion 90 is integrally formed with the casing front portion 14. A web in the form of ribs or legs 102 within the casing front portion 14 extend inward to the domed-shaped canister end cap portion 90. The canister end cap portion 90 includes a locating extension 104 that extends rearward to fit within the bore 106 of the front rim 96 and generally cylindrical portion 88 of the stationary canister 86. The canister end cap portion 90 also has a seal retaining well 108 that receives a static seal 110 that is sealed to the front rim 96 of the stationary canister 86. As with the aforementioned seals 24, 100, the seal 110 may be constructed of various materials, such as an elastomeric O-ring, or preformed or liquid gasket or the like, which is positioned between the seal retaining well 108 and the front rim 96.

Figure 2:
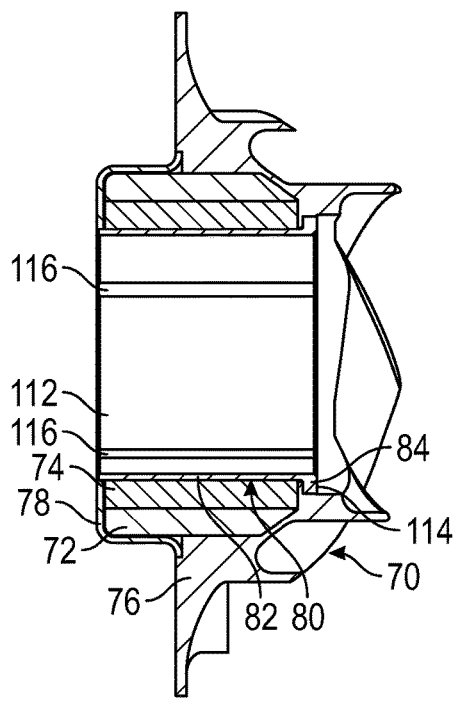
FIG. 2 is an enlarged cross-sectional view of the rotor assembly shown in FIG. 1 which includes a bushing at the inner periphery.
Figure 3:
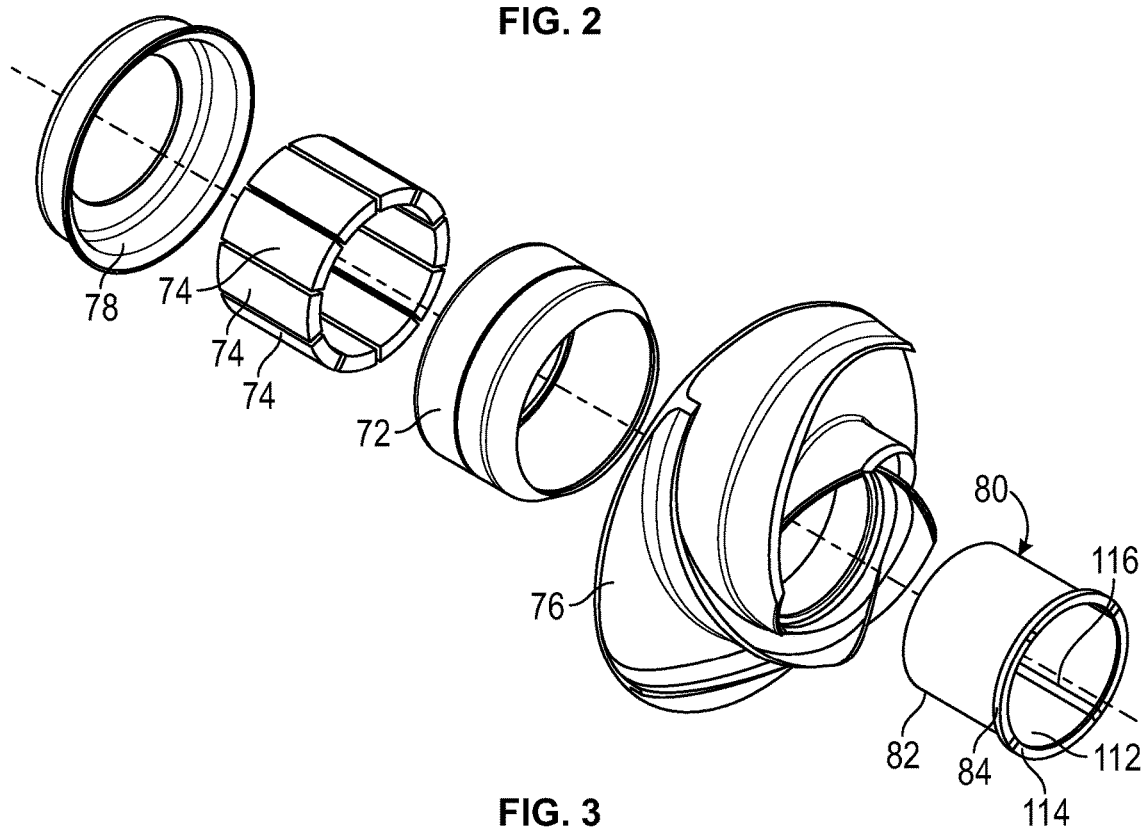
FIG. 3 is a perspective exploded view of the rotor assembly shown in FIGS. 1 and 2.
Figure 4:
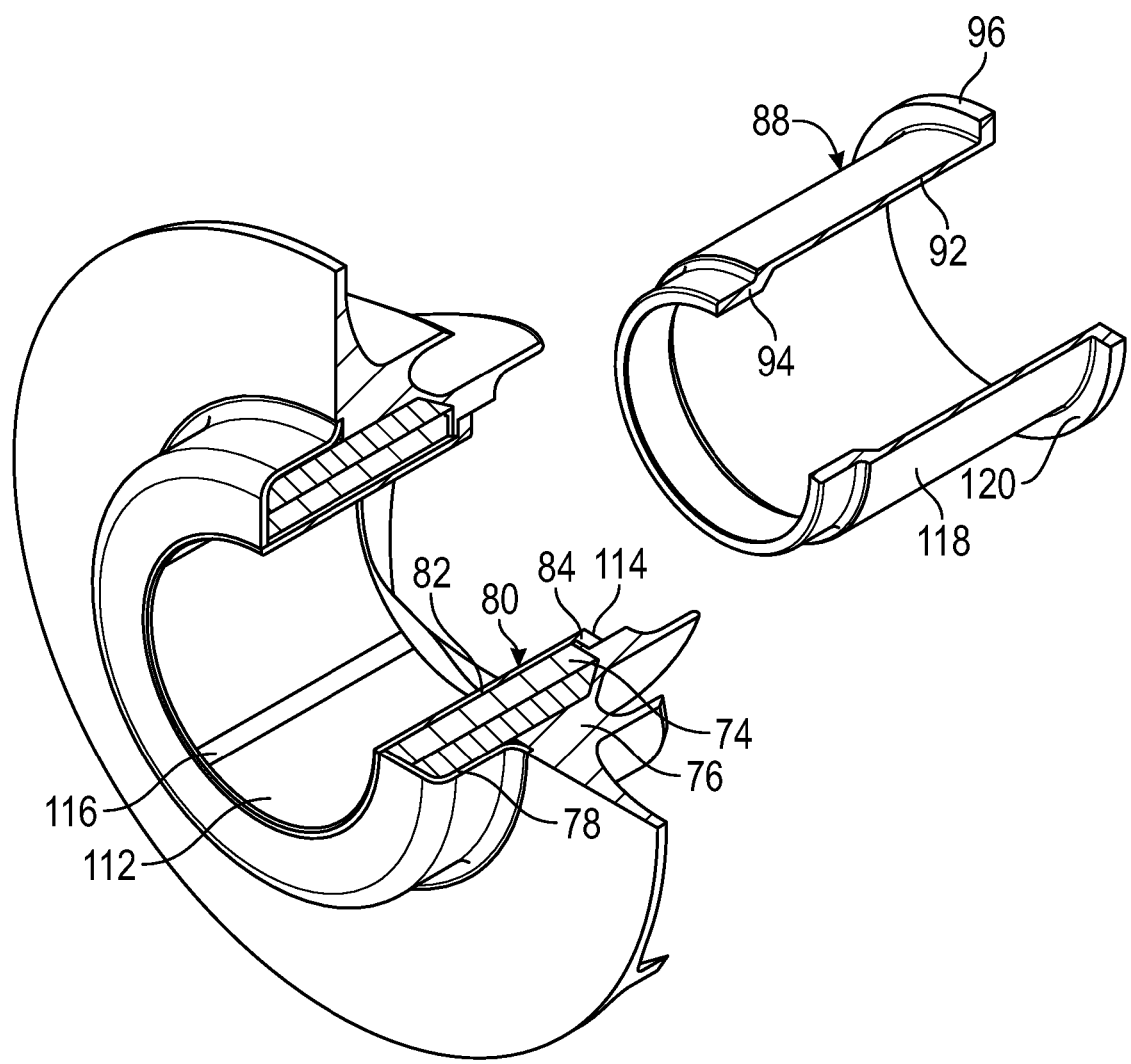
FIG. 4 is a partially-sectioned exploded view of the rotor assembly and the substantially cylindrical portion of the stationary canister shown in FIG. 1.
Figure 5:
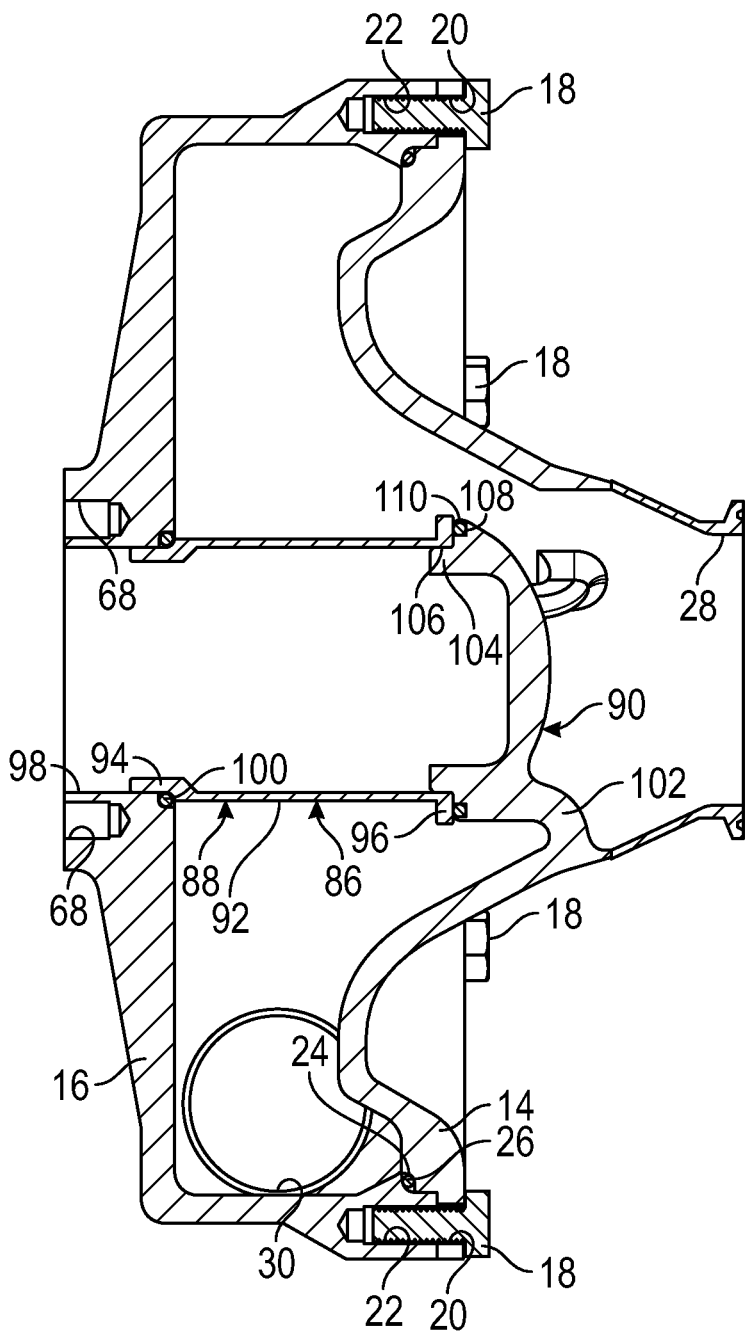
FIG. 5 is a cross-sectional view of the assembled casing front and rear portions, with the stationary canister shown in FIG. 1.
Figure 6:
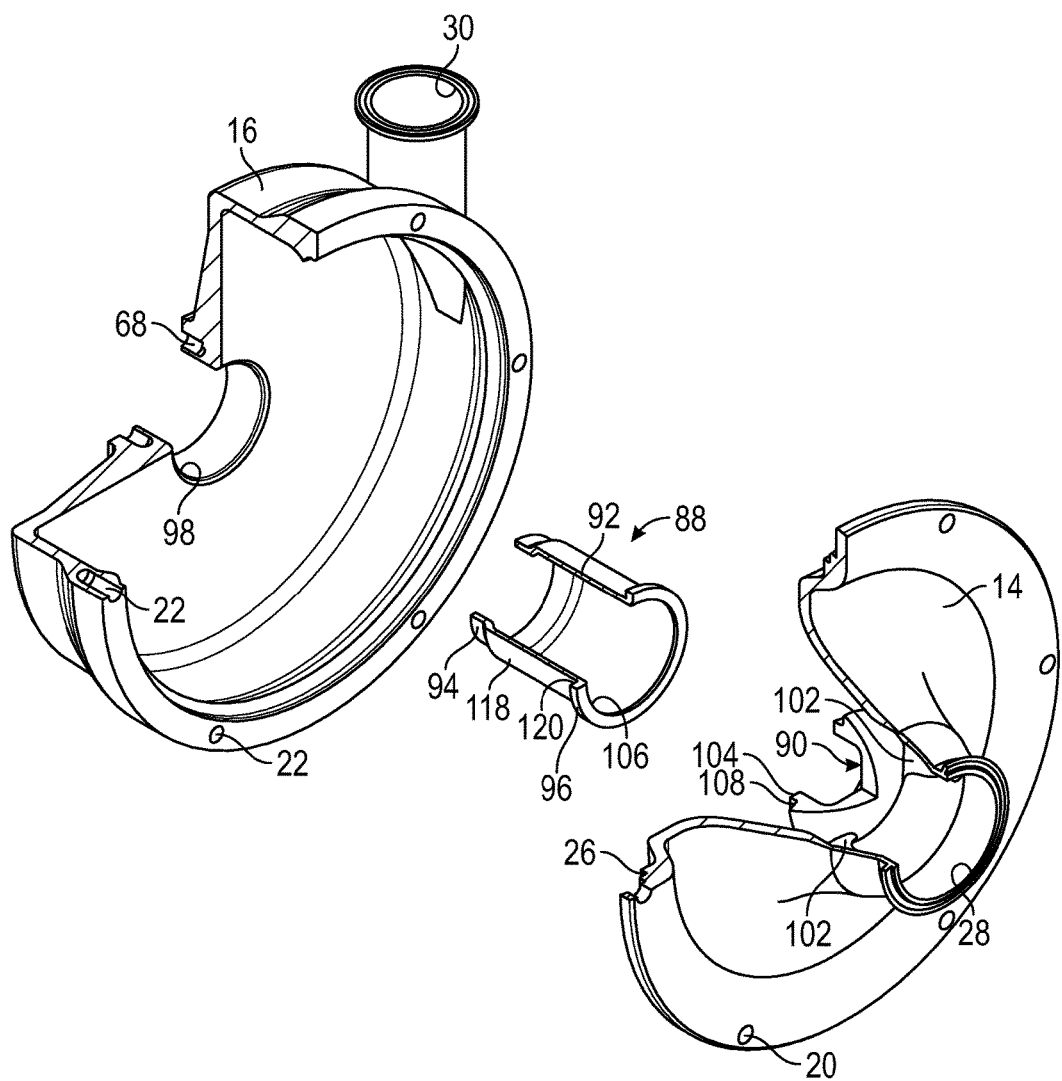
FIG. 6 is a perspective exploded view of the components shown in FIG. 5.

As may be seen in FIGS. 2-4, the bushing 80 includes an elongated radial bearing surface 112 along the inside of the substantially cylindrical portion 82, and an axial thrust bearing surface 114 at the end of the front rim 84. As such, the bushing 80 of the rotor assembly 70 serves three purposes by including a radial bearing surface that engages the stationary canister 86, an axial bearing surface that engages the stationary canister 86 in one axial direction, and by separating or isolating the magnets 74 of the rotor assembly 70 from contact with fluid within the casing 12. To enhance the fluid film along the radial bearing surface 112, the bushing 80 may include reliefs or undercuts 116.

The stationary canister 86 may be seen in FIG. 4 as providing an elongated radial bearing surface 118 along the outer surface of the substantially cylindrical portion 92, and an axial bearing surface 120 on the rear surface of the front rim 96. The stationary canister 86 serves three purposes by including a radial bearing surface that engages the rotor assembly 70, an axial bearing surface that engages the rotor assembly 70 in one axial direction, and by separating or isolating the inner drive portion 34 and its magnets 38 from the fluid in the pumping chamber 32 that is defined by the space between the outside of the stationary canister 86 and the casing 12. As an alternative to the reliefs or undercuts 116 being located in the radial bearing surface 112 of the bushing 80, reliefs or undercuts could be made in the radial bearing surface 118 along the outer surface of the substantially cylindrical portion 92 of the stationary canister 86.

When assembling the rotary device 10 in the form of the example pump shown in FIGS. 1-7C, the bracket 62 is connected to the casing rear portion 16 using the fasteners 64, and then the bracket 62 is aligned with and connected to the motor 50, such as by use of fasteners to connect the components together directly or to connect each of the components respectively to a third mounting component, such as a base plate or other component (not shown). The stationary canister 86 then is slipped through the bushing 80 of the rotor assembly 70. A static seal 100 then is positioned around the neck 94 and the neck 94 is inserted into the central bore 98 in the casing rear portion 16. The spindle 40 then is mounted on the shaft 48 of the motor 50 using the key 52 and the set screw 58.

It will be appreciated that the spindle 40 includes a flared portion 119 that has a larger diameter than the neck 94, and therefore, blocks forward movement of the stationary canister 86. The canister 86, in turn, blocks forward movement of the rotor assembly 70 at the axial bearing surface 120 on the rear surface of the front rim 96, whereas the rotor assembly 70 otherwise would try to move forward when inserting or removing the inner drive portion 34, due to the attraction between the magnets 38 and 74. Once all the components are installed and the rotor assembly 70 is not biased by magnetic forces to move axially, the stationary canister 86 does not interfere with the flared portion 119 or free rotational movement of the rotor assembly 70.

Figure 7A:
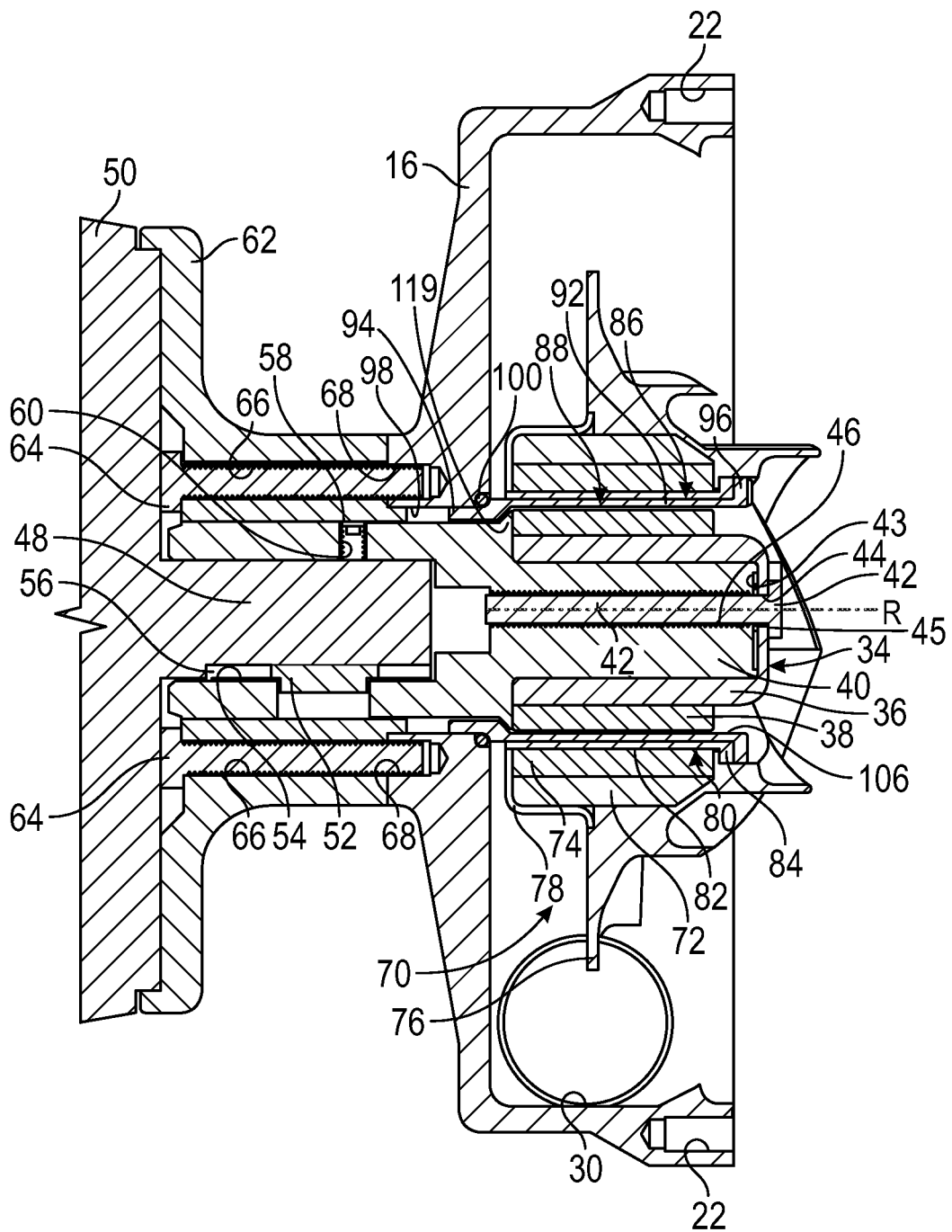
FIG. 7A is a cross-sectional view of the device shown in FIG. 1 with the front casing removed.
Figure 7B:
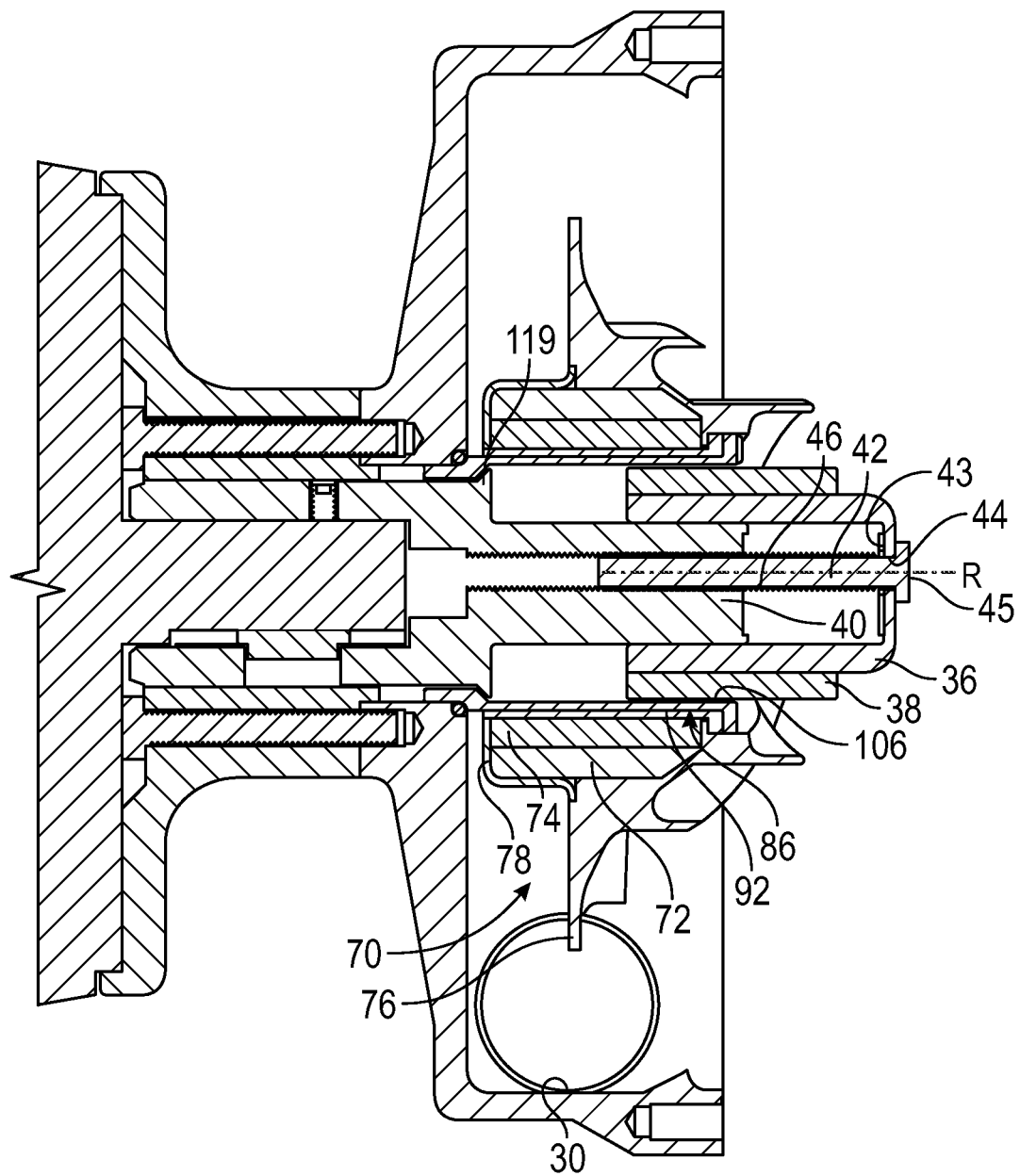
FIG. 7B is a cross-sectional view of the device shown in FIG. 7A with the inner drive portion in a position partially inserted into the rotor assembly.
Figure 7C:
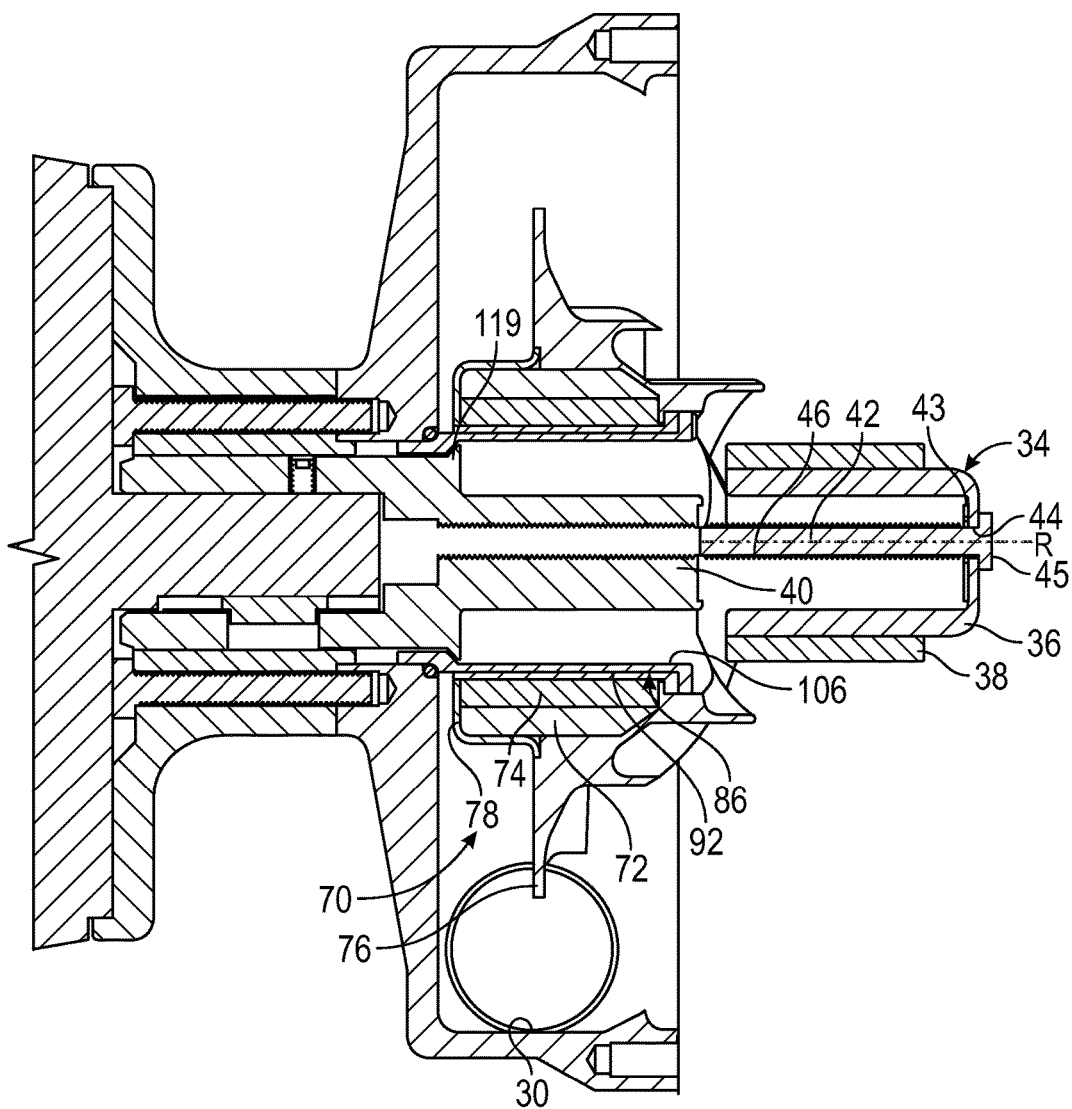
FIG. 7C is a cross-sectional view of the device shown in FIG. 7A with the inner drive portion aligned with the rotor assembly and ready for insertion.

An assembly of the components to this juncture is shown in FIG. 7C, with the inner drive portion 34 moved into position for insertion into the substantially cylindrical portion 92 of the stationary canister 86. To control the insertion of the inner drive portion 34 and overcome attractive and resistive magnetic forces, the fastener 42 is used to move the inner drive portion 34 into an assembled position. This is accomplished by inserting the threaded shaft of the fastener 42 through the bore 44 in the inner magnet ring 36 and engaging the retainer ring 43 in a groove on the fastener 42. The fastener 42 then is inserted into the threaded bore 46 in the spindle 40. The fastener 42 then is gripped at the head 45 and turned to advance the inner drive portion 34, which is shown in an intermediate position in FIG. 7B and then in a fully inserted position in FIG. 7A. This provides a simple and safe method of dealing with strong magnetic forces when joining or separating the magnetically coupled components, using precise, controlled movement that protects the substantially cylindrical portion 92 of the stationary canister 86, while the retainer ring 43 resists rapid movement of the inner drive portion 34 that is magnetically attracted to the rotor assembly 70. This is especially beneficial when using fragile materials in the generally cylindrical portion 88 of the stationary canister 86, such as silicon carbide.

As a final step in assembling the rotary device 10, the casing front portion 14, with its integral canister end portion 90 is installed. Thus, the casing front portion 14, with the static seal 24 in the seal retaining well 26, and the static seal 110 in the retaining well 108, is brought into position to insert the locating extension 104 of the canister end cap portion 90 into the bore 106 in the substantially cylindrical portion 92. As the locating extension 104 is inserted into the bore 106, the bores 20 in the casing front portion 14 are brought into alignment with the threaded bores 22 in the casing rear portion 16. The fasteners 18 then are used to draw the casing front portion 14 to the casing rear portion 16, thereby compressing the seal 24 between the casing front and rear portions 14, 16, while also compressing the seal 100 between the canister end portion 90 and the front rim 96 of the generally cylindrical portion 88 of the stationary canister 86.

When the rotary device 10 is fully assembled, the magnets 38 on the inner drive portion 34 are in close proximity to, axially aligned with, but separated from the magnets 74 of the rotor assembly 70 by the relatively thin-walled substantially cylindrical portion 92 of the stationary canister 86. When the shaft 48 of the drive motor 50 rotates, it causes the inner magnets 38 to rotate which, via a magnetic coupling with the outer magnets 74, causes the rotor assembly 70 and its impeller 76 to rotate. Rotation of the impeller 76 draws fluid into the casing 12 through the axial inlet port 28 at the front end of the casing front portion 14 and expels fluid through the radial outlet port 30 in the side of the casing rear portion 16. The close-coupled drive configuration, with the bushing 80 between the inner drive portion 34 and rotor assembly 70, also allows for a shorter, more space efficient and lighter weight, drive and rotary device installation.

This construction also advantageously provides the ability to remove the casing front portion 14 to inspect or remove the magnetic inner drive portion 34 quickly and without major pump disassembly. In addition, the process of installing the inner drive portion 34 may be reversed to achieve controlled separation of the inner drive portion 34 from the magnetic coupling with the rotor assembly 70. This is achieved by gripping the head 45 of the fastener 42 and turning the fastener 42 to withdraw the fastener 42 and the inner drive portion 34 from their engagement with the spindle 40. Continued rotation to remove the fastener 42 eventually removes the inner drive portion 34 from the magnetic coupling with the rotor assembly 70, which is facilitated by the retaining ring 43 in a groove of the fastener 42 that causes the inner drive portion 34 to move axially with the fastener 42 as it is withdrawn.

Figure 8A:
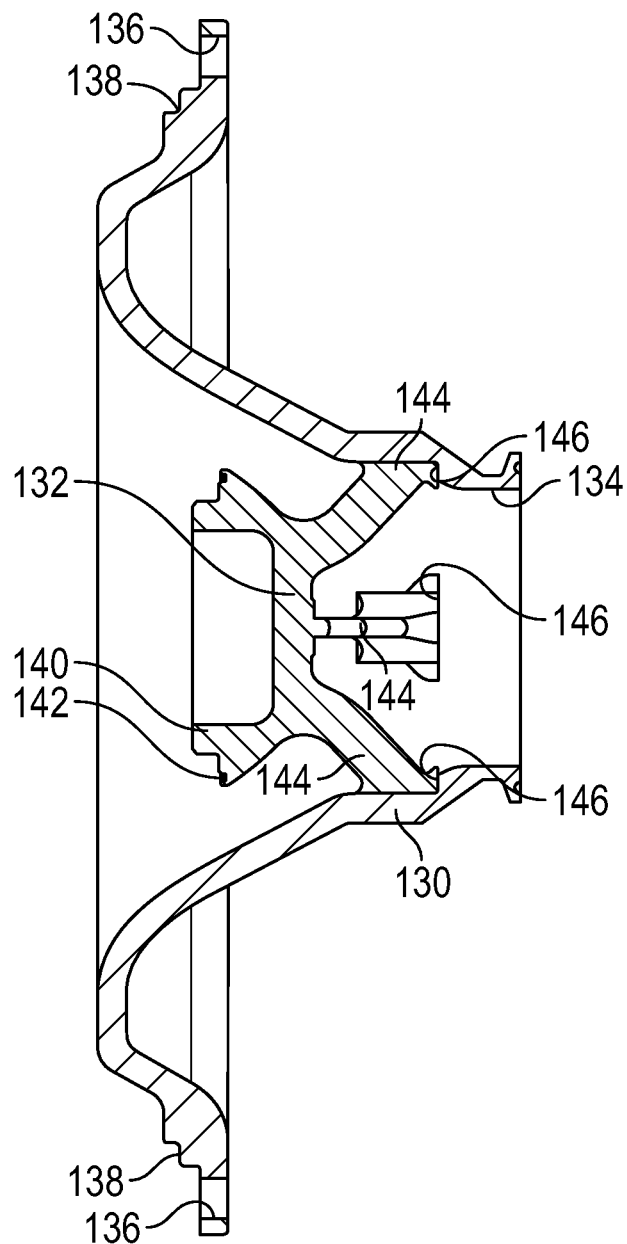
FIG. 8A is a cross-sectional view of an alternative front casing and separate canister end cap portion, which differ from that which is shown in the example of FIG. 1.
Figure 8B:
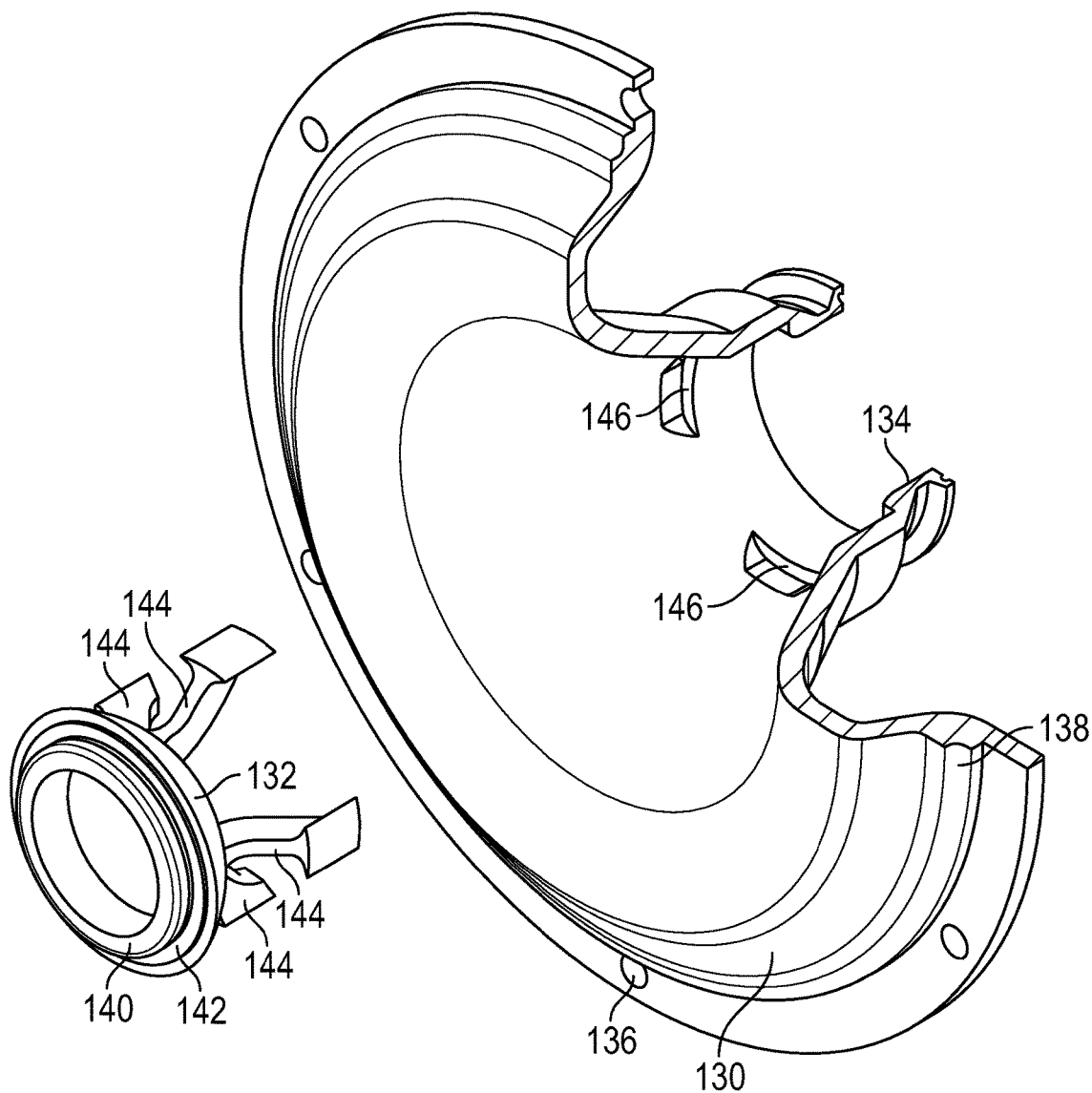
FIG. 8B is a perspective exploded view of the components shown in FIG. 8A, with the front casing being partially sectioned.

Turning to FIGS. 8A and 8B, a second example casing front portion 130 and canister end cap portion 132 are configured for use with the remainder of the assembly of the rotary device 10 of the first example. The second example casing front portion 130 is somewhat similar in construction to the first example casing front portion 14, having an axial inlet port 134, bores 136 for receiving fasteners for connection to the casing rear portion 16, and a seal retaining well 138 that receives the static seal 24 for sealing to the casing rear portion 16.

In the second example, the stationary canister includes a canister end cap portion 132 that is a separate component from the casing front portion 130 and the generally cylindrical portion 88 of the stationary canister. Relative to the previously described first example, the canister end cap portion 132 of the second example also includes a similar locating extension 140 and seal retaining well 142 that receives the static seal 110. The canister end cap portion 132 includes forward extending ribs or legs 144 that engage notches 146 within the axial inlet bore 134. This configuration having the ribs 144 received within the notches 146 allows the casing front portion 130 and its locating extension 140 to locate the stationary canister axially and radially within the casing of a rotary device.

This example permits the canister end cap portion 132 to optionally be constructed of a material that is different than the material used for the casing front portion 130, while also being able to be constructed of the same or a different material than the generally cylindrical portion 88 of the stationary canister.

Figure 9A:
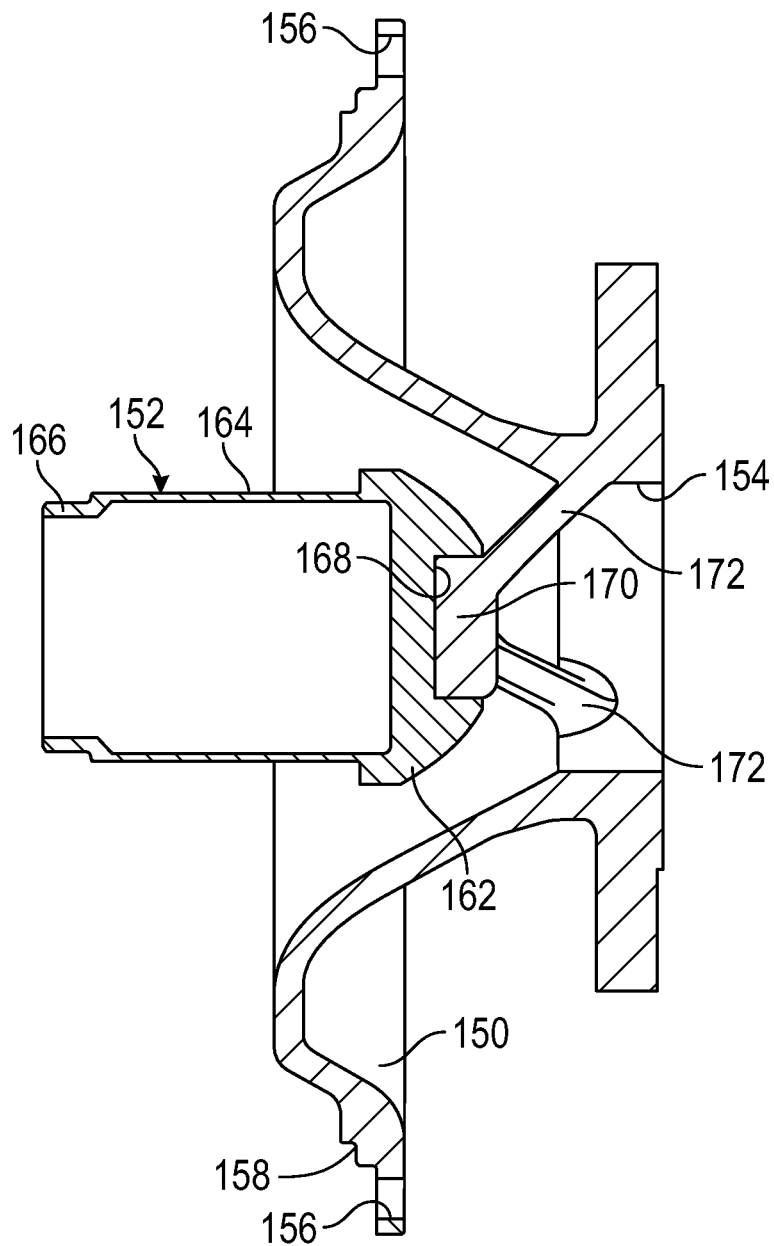
FIG. 9A is a cross-sectional view of a further alternative front casing and a separate unitary stationary canister, which differ from that which is shown in the examples of FIGS. 1 and 8A.
Figure 9B:
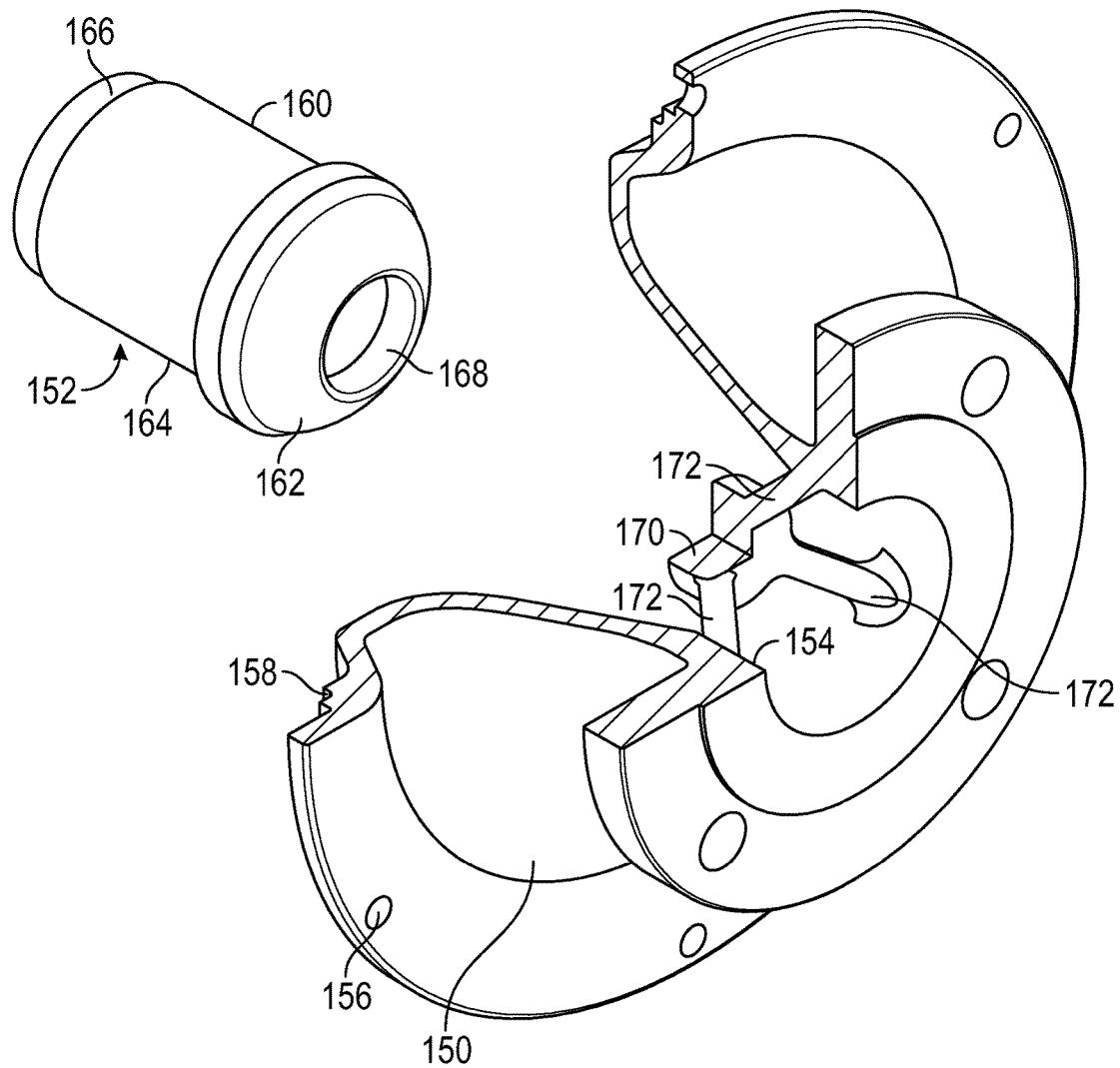
FIG. 9B is a perspective exploded view of the components shown in FIG. 9A, with the front casing being partially sectioned.

Turning to FIGS. 9A and 9B, a third example casing front portion 150 and an alternative stationary canister 152 are illustrated. The third example casing front portion 150 is somewhat similar in construction to the first example casing front portion 14, having an axial inlet port 154, bores 156 for receiving fasteners for connection to the casing rear portion 16, and a seal retaining well 158 that receives the static seal 24 for sealing to the casing rear portion 16.

In the third example, the stationary canister 152 is of unitary construction, thus an integrally formed single piece includes both a generally cylindrical portion 160 and a canister end cap portion 162. Similar to the prior examples, the generally cylindrical portion 160 includes a substantially cylindrical portion 164 and a neck 166 at the rear of the stationary canister 152. The stationary canister 152 and casing front portion 150 are configured for use with the remainder of the assembly of the rotary device 10 of the first example.

In the alternative third example, the stationary canister 152 may be constructed of a material that is different than that of the casing front portion 150. The canister end cap portion 162 includes a recess 168 that receives a projection 170 that is integrally connected to the casing front portion 150 by ribs or legs 172 within the casing front portion 150. The projection 170 fitting within the recess 168 allows the casing front portion 150 to locate the stationary canister 152 axially and radially within the casing of a rotary device.

Figure 10A:
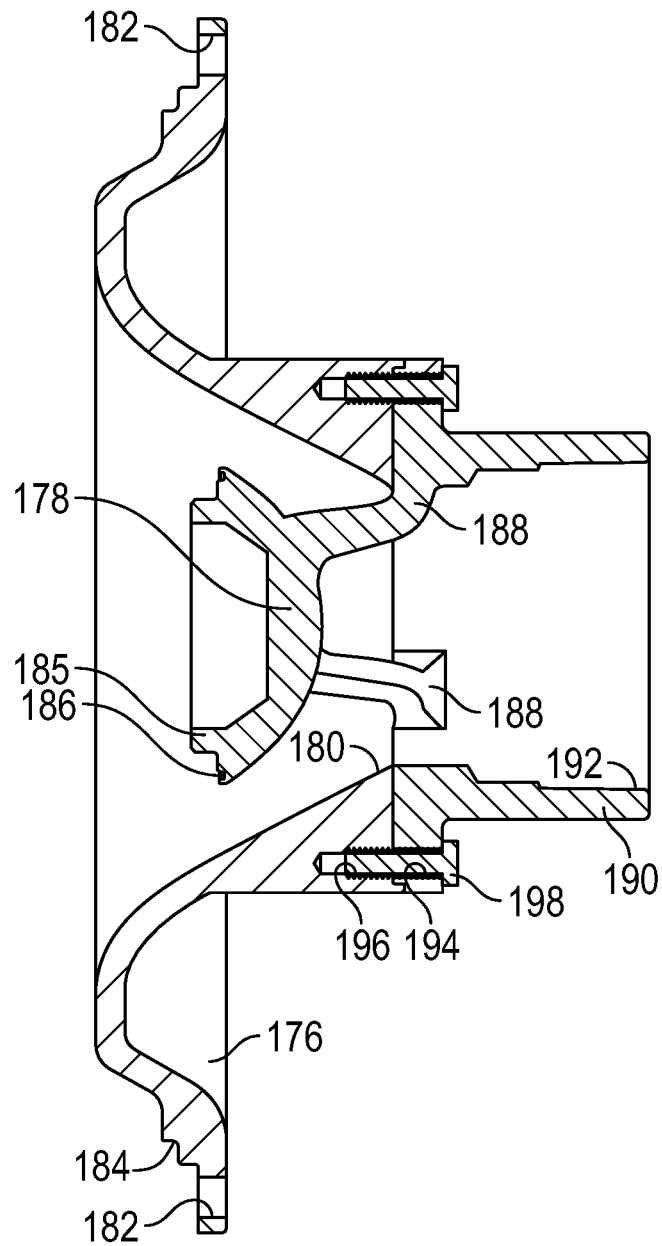
FIG. 10A is a cross-sectional view of another alternative front casing and separate canister end cap portion, which differ from that which is shown in the examples of FIGS. 1, 8A and 9A.
Figure 10B:
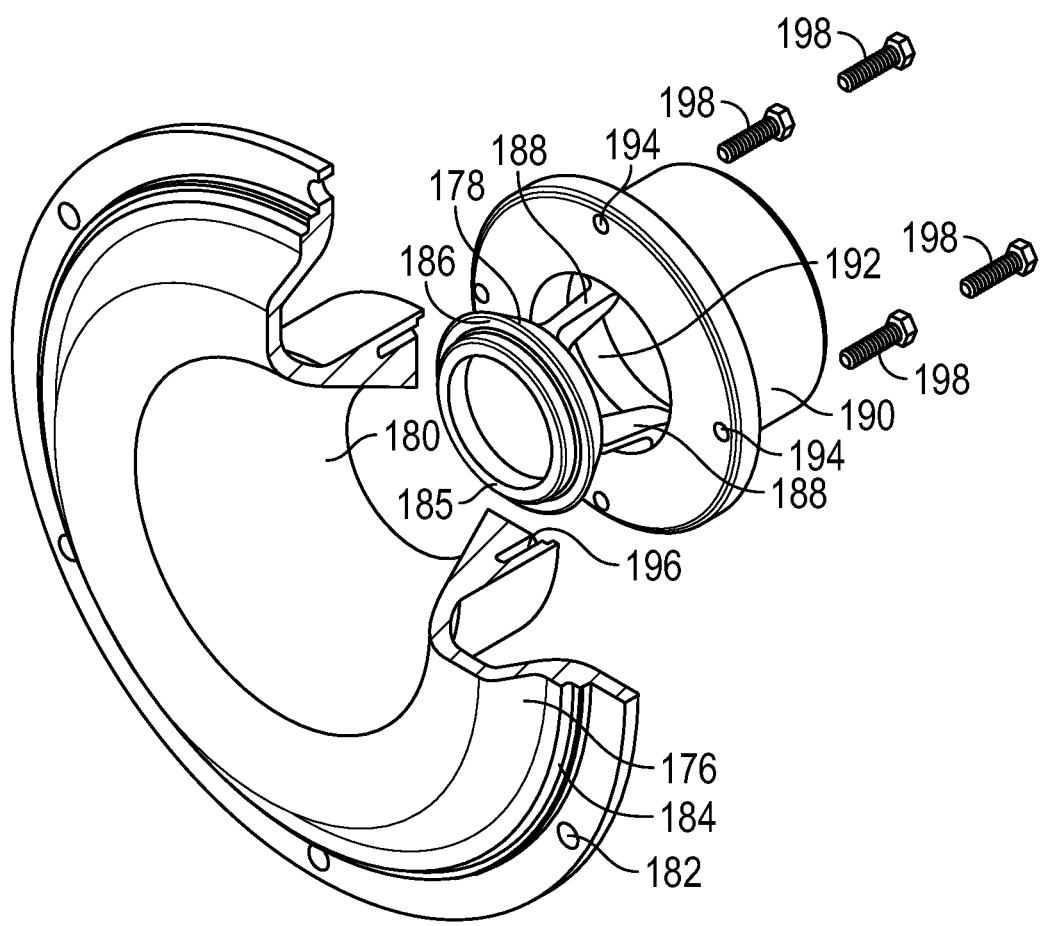
FIG. 10B is a perspective exploded view of the components shown in FIG. 10A, with the front casing being partially sectioned.

Turning to FIGS. 10A and 10B, a fourth example casing front portion 176 and canister end cap portion 178 are configured for use together with the remainder of the assembly of the rotary device 10 of the first example. The fourth example casing front portion 176 is somewhat similar in construction to the first example casing front portion 14, having an axial inlet port 180, bores 182 for receiving fasteners for connection to the casing rear portion 16, and a seal retaining well 184 that receives the static seal 24 for sealing to the casing rear portion 16.

In the fourth example, the stationary canister includes the canister end cap portion 178 that is a separate component from the casing front portion 176 and the generally cylindrical portion 88 of the stationary canister. Relative to the previously described first example, the canister end cap portion 178 of the fourth example also includes a similar locating extension 185 and seal retaining well 186 that receives the static seal 110. The canister end cap portion 178 includes forward extending ribs or legs 188 that are joined in a forward flange 190 that is connected to the forward end of the casing front portion 176 and includes an axial inlet port 192. The forward flange 190 includes bores 194, while the casing front portion 176 includes threaded bores 196, with fasteners 198, such as threaded bolts, passing through the bores 194 and being threadably received in threaded bores 196. This configuration having the ribs 188 connected to the forward flange 190 allows the casing front portion 176 and its locating extension 184 to locate the stationary canister axially and radially within the casing of a rotary device.

This fourth example permits the canister end cap portion 178 to optionally be constructed of a material that is different than the material used for the casing front portion 176, while also being able to be constructed of the same or a different material than the generally cylindrical portion 88 of the stationary canister. Each of the examples includes a rotor assembly having a bushing that engages a stationary canister, with each of these components serving the same three purposes as were described with respect to the first example embodiment of FIGS. 1-7C.

Figure 11A:
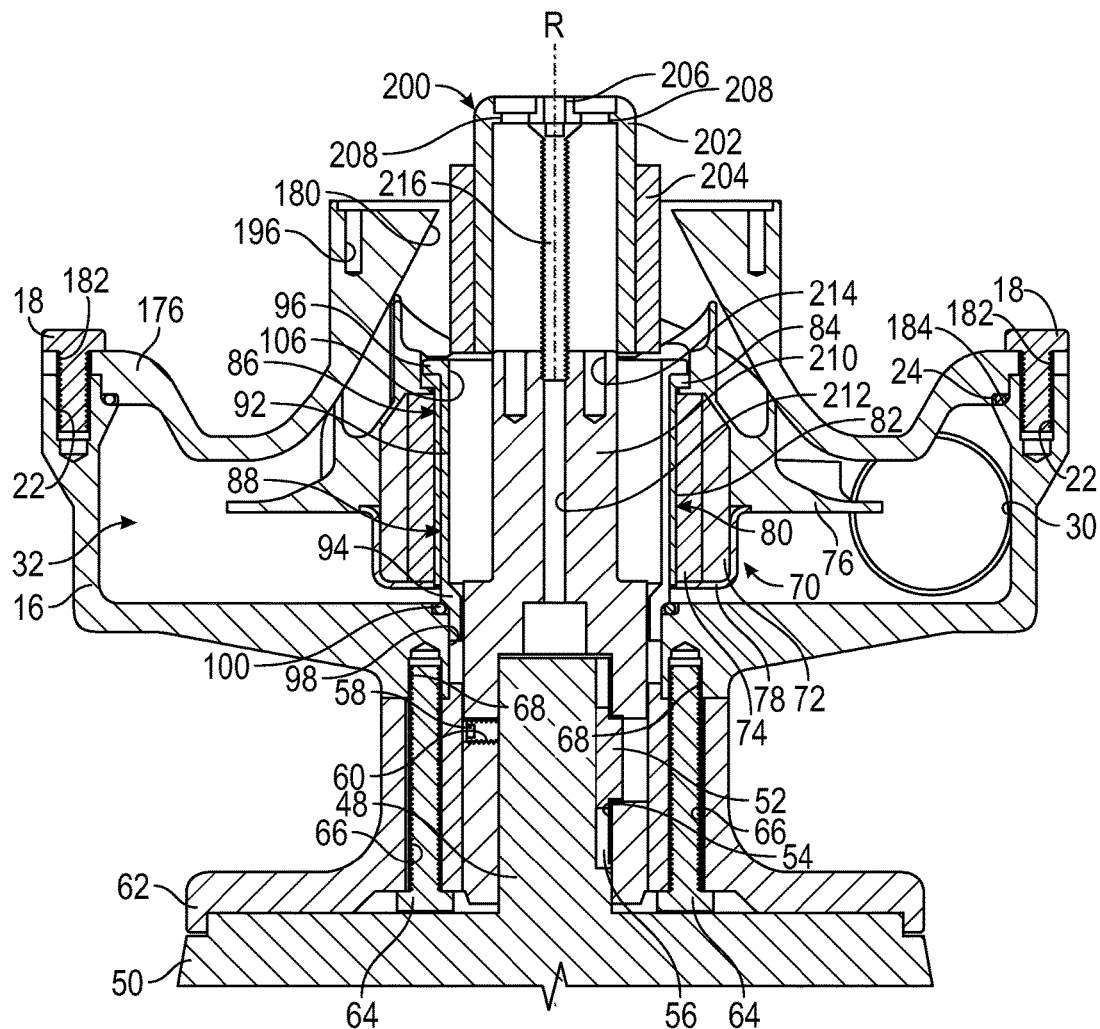
FIG. 11A is a cross-sectional view of complementary components to that shown in FIGS. 10A and 10B of an alternative example rotary device, with the inner drive portion aligned with the rotor assembly and ready for insertion.
Figure 11B:
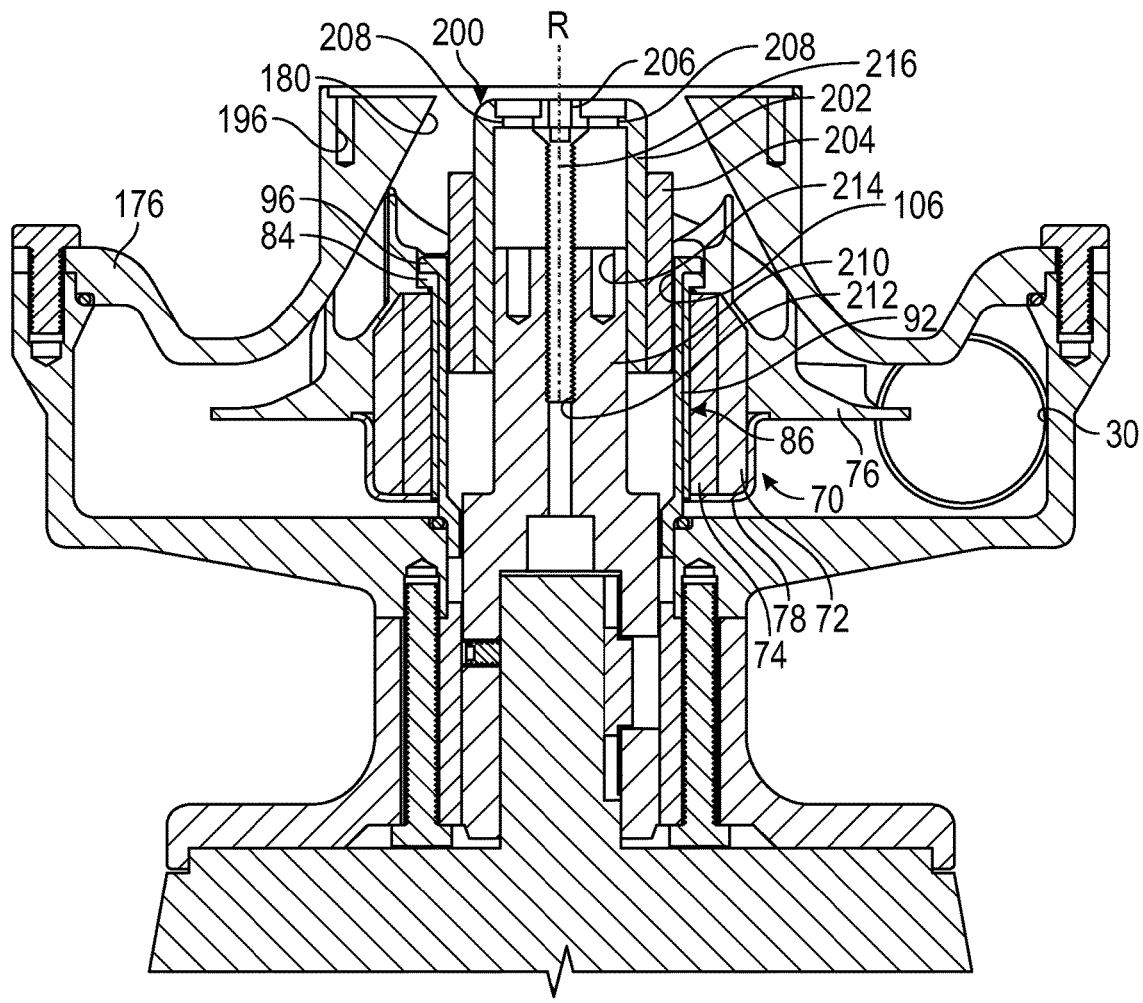
FIG. 11B is a cross-sectional view of the device shown in FIG. 11A with the inner drive portion in a position partially inserted into the rotor assembly.
Figure 11C:
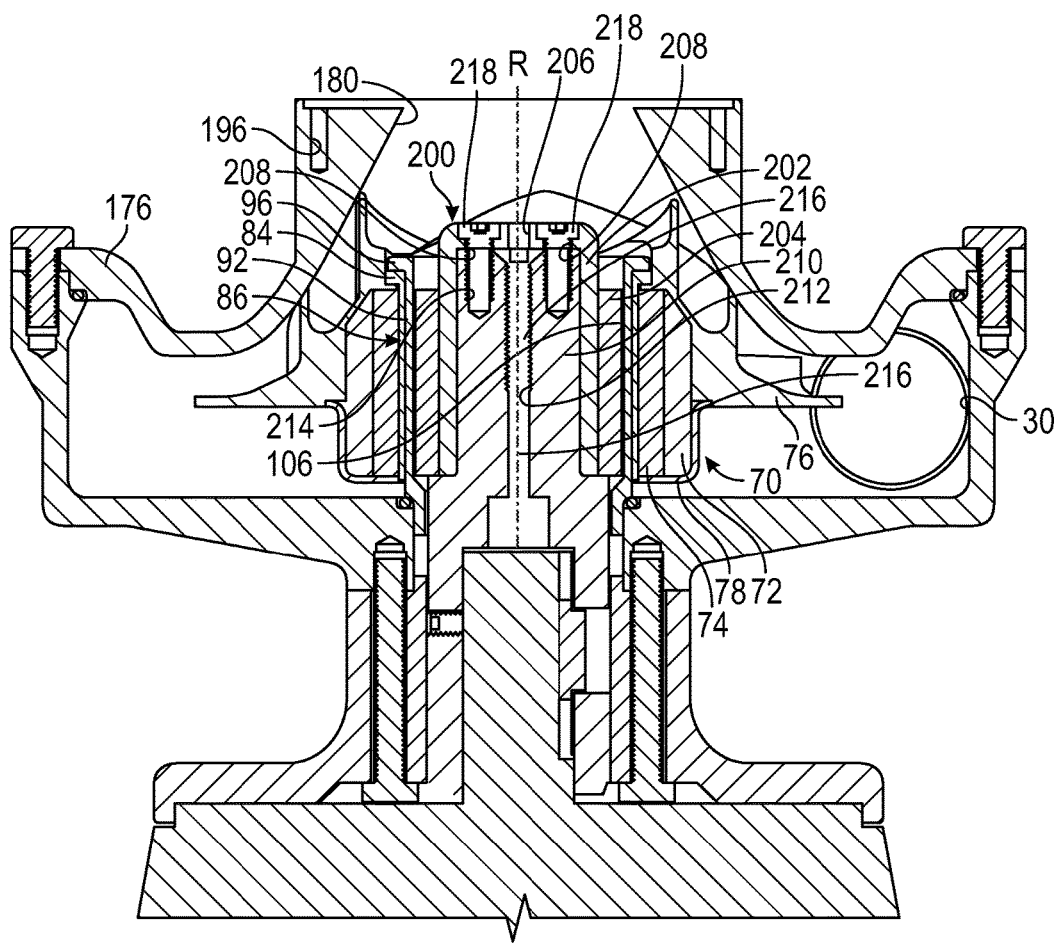
FIG. 11C is a cross-sectional view of the device shown in FIG. 11A with the inner drive portion fully inserted into the rotor assembly.

The series of FIGS. 7A-7C were described above with respect to the first example embodiment and how its inner drive portion 34 may be accessed with the casing front portion 14 removed, as well as be installed in a controlled manner using a fastener 42. In a similar manner, FIGS. 11A-11C may be viewed to see how the inner drive portion 200 of the fourth example may be examined, installed or removed while the casing front portion 176 shown in FIGS. 10A and 10B is installed.

In the fourth example, the inner drive portion 200 includes an inner magnet ring 202 with permanent magnets 204. The inner magnet ring 202 has a central aperture 206, and a pair of spaced apart bores 208. The inner drive portion 200 is configured to be connected to an alternative spindle 210 that includes a central threaded bore 212 and a pair of spaced apart threaded bores 214. An elongated threaded fastener 216 may be inserted into the central threaded bore 212, which may be accessible to rotate through the central aperture 206 in the front end of the inner magnet ring 202 to advance or retract the inner drive portion 200 relative to the spindle 210. This can be appreciated when viewing FIGS. 11A and 11B, which show the inner drive portion 200 in an initial engagement position in FIG. 11A and then in an intermediate position of installation in FIG. 11B, and by appreciating that the fastener 216 acts as a jack screw that is used to control the separation of the inner drive portion 200 from the spindle 210 to resist the magnetic attraction between the inner drive portion 200 and the rotor assembly 70.

When the inner drive portion 200 is relatively close to the spindle 210, a pair of fasteners 218 may be inserted through the bores 208 in the inner magnet ring 202 and into the spaced apart threaded bores 214. The pair of fasteners 218 are shown fully installed in FIG. 11C, as well as the remainder of the casing rear portion 16, motor 50, bracket 62 and rotor assembly 70 that may be constructed in the same manner as in the first example rotary device 10 shown in FIGS. 1-7C. It will be appreciated that assembly of this example rotary device would be in the same order as previously described, but the canister end cap portion 178 and its forward flange 190 and static seal 110 may be installed last, or may be connected to the casing front portion 176, with the casing front portion 176 and its static seal 24 then being installed last.

When the rotary device of the fourth example is fully assembled, the magnets 204 on the inner drive portion 200 are in close proximity to, axially aligned with, but separated from the magnets 74 of the rotor assembly 70 by the relatively thin-walled substantially cylindrical portion 92 of the stationary canister 86. When the shaft 48 of the drive motor 50 rotates, it causes the inner magnets 204 to rotate which, via a magnetic coupling with the outer magnets 74, causes the rotor assembly 70 and its impeller 76 to rotate. Rotation of the impeller 76 draws fluid into the casing 12 through the axial inlet port 180 at the front end of the casing front portion 176 and through the axial inlet port 192 in the forward flange 190 of the canister end portion 178, and expels fluid through the radial outlet port 30 in the side of the casing rear portion 16. As with the first example, the close-coupled drive configuration of the fourth rotary device, with the bushing 80 between the inner drive portion 200 and rotor assembly 70, also allows for a shorter, more space efficient and lighter weight, drive and rotary device installation.

From the above disclosure, it will be apparent that rotary devices constructed in accordance with this disclosure may include a number of structural aspects that provide numerous advantages over conventional constructions. The example pumps shown herein may exhibit one or more of the above-referenced potential advantages, depending upon the specific design chosen.

It will be appreciated that a rotary device constructed in accordance with the present disclosure may be provided in various configurations. Any variety of suitable materials of construction, configurations, shapes and sizes for the components and methods of connecting the components may be utilized to meet the particular needs and requirements of an end user. It will be apparent to those skilled in the art that various modifications can be made in the design and construction of such rotary devices without departing from the scope or spirit of the claimed subject matter, and that the claims are not limited to the preferred embodiments illustrated herein. It also will be appreciated that the example embodiments are shown in simplified form, so as to focus on the key components and to avoid including structures that are not necessary to the disclosure and that would over complicate the drawings.

The invention claimed is:

1. A rotary device having a magnet coupling comprising:
    a casing having a front portion and a rear portion;
    a rotatable inner drive portion of a magnetic coupling having multiple magnets proximate an outer periphery of the inner drive portion;
    a rotor assembly that includes a driven portion of the magnetic coupling having multiple magnets proximate an inner periphery of the rotor assembly and being disposed radially outward of the magnets on the inner drive portion;
    the inner drive portion and rotor assembly being disposed within the casing and being rotatable about a rotational axis;
    a stationary canister comprising a cylindrical portion disposed between the magnets of the inner drive portion and the magnets of the rotor assembly, said cylindrical portion including a radial bearing surface axially located between the inner and outer magnets and the radial bearing surface of the cylindrical portion engages and serves as a radial bearing for the rotor assembly, the stationary canister further comprising an axial bearing surface that is engaged by the rotor assembly in an axial direction, and the stationary canister separates an internal fluid chamber within the casing from the inner drive portion.

2. The rotary device of claim 1 wherein the rotary device further comprises a pump and the casing further comprises an inlet port and an outlet port in communication with a pumping cavity, with the rotor assembly being disposed in the pumping cavity.

3. The rotary device of claim 1 wherein the rotor assembly further comprises a bushing disposed between the inner periphery of the magnets of the rotor assembly and the cylindrical portion of the stationary canister.

4. The rotary device of claim 3 wherein the bushing disposed between the inner periphery of the magnets of the rotor assembly and the cylindrical portion of the stationary canister includes a radial bearing surface that engages the stationary canister, an axial bearing surface that engages the stationary canister in one axial direction, and separates the magnets of the rotor assembly from contact with fluid within the casing.

5. A rotary device having a magnet coupling comprising:
a casing having a front portion and a rear portion;
a rotatable inner drive portion of a magnetic coupling having multiple magnets proximate an outer periphery of the inner drive portion;
a rotor assembly that includes a driven portion of the magnetic coupling having multiple magnets proximate an inner periphery of the rotor assembly;
the inner drive portion and rotor assembly being disposed within the casing and being rotatable about a rotational axis; and
a stationary canister comprising a cylindrical portion disposed between the magnets of the inner drive portion and the magnets of the rotor assembly, a canister end cap portion that sealingly closes a front end of the stationary canister and is supported by or integrally formed with the front portion of the casing, and a rear end of the stationary canister that contacts or is integral with the rear portion of the casing, wherein the stationary canister separates an internal fluid chamber within the casing from the inner drive portion.

6. The rotary device of claim 5 wherein the magnets of the inner drive portion and the rotor assembly are permanent magnets.

7. The rotary device of claim 5 wherein the rotary device further comprises a pump and the casing further comprises an inlet port and an outlet port in communication with a pumping cavity that houses the rotor assembly.

8. The rotary device of claim 7 wherein the rotor assembly further comprises an impeller.

9. A rotary device having a magnet coupling comprising:
a casing having a front portion and a rear portion;
a rotatable inner drive portion of a magnetic coupling having multiple magnets proximate an outer periphery of the inner drive portion;
a rotor assembly that includes a driven portion of the magnetic coupling having multiple magnets proximate an inner periphery of the rotor assembly and being disposed radially outward of the magnets on the inner drive portion;
the inner drive portion and rotor assembly being disposed within the casing and being rotatable about a rotational axis; and
a stationary canister comprising a cylindrical portion disposed between the magnets of the inner drive portion and the magnets of the rotor assembly, wherein the stationary canister is held in place radially and axially by compression applied axially through the cylindrical portion by the front and rear casing portions and the stationary canister separates an internal fluid chamber within the casing from the inner drive portion.

10. The rotary device of claim 9 wherein the stationary canister further comprises a rear end that contacts or is integral with the rear portion of the casing.

11. The rotary device of claim 9 wherein the stationary canister further comprises a canister end cap portion that sealingly closes a front end of the stationary canister and is supported by or integrally formed with the front portion of the casing.

12. The rotary device of claim 11 wherein the front end of the stationary canister includes a peripheral flange that is sealed to the canister end cap portion by a static seal.

13. A rotary device having a magnet coupling comprising:
a casing having a front portion and a rear portion;
a rotatable inner drive portion of a magnetic coupling having multiple magnets proximate an outer periphery of the inner drive portion;
a rotor assembly that includes a driven portion of the magnetic coupling having multiple magnets proximate an inner periphery of the rotor assembly;
the inner drive portion and rotor assembly being disposed within the casing and being rotatable about a rotational axis; and
a multi-piece stationary canister having a cylindrical portion and including a front end portion having an opening sized to receive the inner drive therethrough and being constructed of a material that is non-conductive or semi-conductive and a rear portion that contacts or is integral with the rear portion of the casing, with the cylindrical portion being disposed between the magnets of the inner drive portion and the magnets of the rotor assembly, and a separate end cap that closes the opening in the front end portion and is constructed of a material that is non-conductive, semi-conductive or conductive, and wherein the multi-piece stationary canister separates an internal fluid chamber within the casing from the inner drive portion, and the separate end cap is removable to access the inner drive portion while the rotor assembly remains within the rear portion of the casing.

14. The rotary device of claim 13 wherein a bushing is disposed between the inner periphery of the magnets of the rotor assembly and the cylindrical portion of the multi-piece stationary canister wherein the bushing provides a radial bearing surface that engages the multi-piece stationary canister and extends along the entire length of the magnets of the rotor assembly, an axial bearing surface that engages the multi-piece stationary canister in one axial direction, and separates the magnets of the rotor assembly from contact with fluid within the casing.

15. The rotary device of claim 13 wherein the multi-piece stationary canister is held in place radially and axially by compression applied axially through the cylindrical portion by the front and rear casing portions.

16. The rotary device of claim 13 wherein the front end portion of the multi-piece stationary canister includes a peripheral flange that is sealed to the separate end cap by a static seal.

17. The rotary device of claim 13 wherein the
separate end cap is supported by or integrally formed with the front portion of the casing, and a rear end of the muti-piece stationary canister that contacts or is integral with the rear portion of the casing;
a bushing disposed between the inner periphery of the magnets of the rotor assembly and the cylindrical portion of the multi-piece stationary canister; and
wherein the multi-piece stationary canister separates an internal fluid chamber within the casing from the inner drive portion and the separate end cap is removable to access the inner drive portion while the rotor assembly remains within the rear portion of the casing.

18. The rotary device of claim 13 wherein the rotary device further comprises a pump and the casing further comprises an inlet port and an outlet port in communication with a pumping cavity, with the rotor assembly being disposed in the pumping cavity.

* * * * *